US009854568B2

(12) United States Patent
Chen et al.

(10) Patent No.: US 9,854,568 B2
(45) Date of Patent: Dec. 26, 2017

(54) TECHNIQUES FOR TRANSMITTING A CONTROL CHANNEL AND A DATA CHANNEL OVER MULTIPLE COMPONENT CARRIERS

(71) Applicant: QUALCOMM Incorporated, San Diego, CA (US)

(72) Inventors: Wanshi Chen, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 14/866,455

(22) Filed: Sep. 25, 2015

(65) Prior Publication Data

US 2016/0100447 A1    Apr. 7, 2016

Related U.S. Application Data

(60) Provisional application No. 62/059,699, filed on Oct. 3, 2014.

(51) Int. Cl.
*H04W 72/04* (2009.01)
*H04W 40/04* (2009.01)
(Continued)

(52) U.S. Cl.
CPC ....... *H04W 72/0413* (2013.01); *H04L 5/0053* (2013.01); *H04W 40/04* (2013.01);
(Continued)

(58) Field of Classification Search
CPC ..... H04W 40/00; H04W 40/02; H04W 40/08; H04W 52/00; H04W 52/14;
(Continued)

(56) References Cited

U.S. PATENT DOCUMENTS

| 2011/0319112 A1* | 12/2011 | Jeong | H04W 52/146 455/509 |
| 2012/0039278 A1* | 2/2012 | Park | H04W 72/1278 370/329 |

(Continued)

OTHER PUBLICATIONS

International Search Report and Written Opinion—PCT/US2015/052680—ISA/EPO—Dec. 11, 2015. (10 pages).

*Primary Examiner* — Ashley Shivers
(74) *Attorney, Agent, or Firm* — Arent Fox LLP

(57) ABSTRACT

Certain aspects of the present disclosure relate to transmitting control and data channels over multiple carriers in wireless communications. Configuration information can be obtained for a plurality of component carriers configured by one or more cells. An indication to perform parallel transmission of a control channel and a data channel with the one or more cells can be received. It can be determined whether the parallel transmission is supported over at least one component carrier of the plurality of component carriers. At least one of the control channel, the data channel, or a combination thereof, can be transmitted over the at least one component carrier based at least in part on the indication to perform the parallel transmission and based at least in part on determining whether the parallel transmission is supported over the at least one component carrier.

30 Claims, 11 Drawing Sheets

(51) Int. Cl.
  *H04W 72/12*    (2009.01)
  *H04W 74/00*    (2009.01)
  *H04W 76/02*    (2009.01)
  *H04L 5/00*     (2006.01)

(52) U.S. Cl.
  CPC ..... *H04W 72/042* (2013.01); *H04W 72/0453* (2013.01); *H04W 72/1284* (2013.01); *H04W 74/004* (2013.01); *H04W 76/025* (2013.01); *H04L 5/001* (2013.01); *H04L 5/0044* (2013.01)

(58) Field of Classification Search
  CPC ........... H04W 52/146; H04W 72/0413; H04W 72/1278; H04W 74/004
  See application file for complete search history.

(56) References Cited

U.S. PATENT DOCUMENTS

| | | |
|---|---|---|
| 2012/0113845 A1 | 5/2012 | Kim et al. |
| 2013/0178221 A1* | 7/2013 | Jung ..................... H04L 9/0844 455/450 |
| 2013/0188580 A1 | 7/2013 | Dinan |
| 2013/0230004 A1* | 9/2013 | Nam ....................... H04L 5/001 370/329 |
| 2013/0272233 A1 | 10/2013 | Dinan |
| 2014/0177555 A1* | 6/2014 | Ng .................... H04W 72/0406 370/329 |
| 2016/0029231 A1* | 1/2016 | Kazmi ............. H04W 72/1226 370/252 |
| 2016/0044655 A1* | 2/2016 | Park .................. H04W 72/1284 370/329 |
| 2016/0192350 A1* | 6/2016 | Yi ....................... H04W 52/146 370/329 |
| 2017/0111159 A1* | 4/2017 | Lee ......................... H04L 5/001 |

\* cited by examiner

TECHNIQUES FOR TRANSMITTING A CONTROL CHANNEL AND A DATA CHANNEL OVER MULTIPLE COMPONENT CARRIERS

CLAIM OF PRIORITY UNDER 35 U.S.C. §119

The present application for patent claims priority to Provisional Application No. 62/059,699 entitled "TECHNIQUES FOR TRANSMITTING A CONTROL CHANNEL AND DATA CHANNEL OVER MULTIPLE COMPONENT CARRIERS" filed Oct. 3, 2014, which is assigned to the assignee hereof and hereby expressly incorporated in its entirety by reference herein.

FIELD OF THE DISCLOSURE

The present disclosure, for example, relates to wireless communication systems, and more particularly to techniques for transmitting a control channel and a data channel over one or more component carriers in wireless communications.

BACKGROUND OF THE DISCLOSURE

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations (e.g., eNodeBs) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

In carrier aggregation, the UE can be configured to communicate with a cell over multiple component carriers to facilitate improved data throughput, diversity, reliability, etc. One of the multiple component carriers is assigned as a primary component carrier, over which control data is communicated for the primary component carrier and any other secondary component carriers, which may include control information to activate/deactivate the secondary component carriers.

In multiple connectivity, the UE can be configured to communicate with multiple cells or cell groups configured by multiple base stations using multiple links. Each of the links may be configured with multiple component carriers (e.g., carrier aggregation over one or more of the multiple links with the corresponding cell group). In this configuration, the UE can communicate control data for each link over a primary component carrier configured for the given link.

Third generation partnership project (3GPP) long term evolution (LTE) UEs can support the ability to transmit a control channel and data channel in parallel, however this ability implies that the UE can support parallel control and data channel communications over a current baseband, but is band agnostic. Moreover, 3GPP LTE UEs can support the ability to communicate using non-contiguous resource allocations within a component carrier, which is signaled per band and is band specific. Thus, it is possible that a UE supports parallel control and data channel communications over a baseband, but does not support non-contiguous resource allocations within a component carrier, and therefore cannot support the parallel control and data channel communications within the component carrier. In carrier aggregation and dual connectivity, parallel control and data communications are not tied with a specific carrier or band, and thus if the UE is configured with parallel control and data transmissions, the handling is independent of whether the UE is capable of performing the parallel transmission on the same carrier, depending on its capability for the corresponding band.

SUMMARY OF THE DISCLOSURE

Aspects of the present disclosure relate generally to wireless communications, and more particularly, to techniques for transmitting a control and a data channel over one or more component carriers in wireless communications.

In accordance with an aspect, a user equipment (UE) configured to communicate over multiple carriers in carrier aggregation and/or dual connectivity can determine whether it is also configured to perform parallel transmission of a control channel and a data channel. If so, the UE can determine whether the parallel transmission is supported on a given component carrier (CC), and can accordingly transmit the control channel and/or the data channel over the given CC. For example, where a UE configured to perform parallel transmission of control and data channels is assigned a CC for which it cannot perform the parallel transmission, the UE may prohibit parallel transmission of the control channel and data channel altogether (e.g., such that the UE cannot perform parallel transmission of the control and data channel over the CC and/or any combination of CCs). In another example, where the UE configured to perform parallel transmission is assigned a CC for which it cannot perform the parallel transmission, the UE may still support parallel transmission of the control channel and data channel over capable CCs while prohibiting parallel transmission of the control channel and data channel over the assigned CC. In yet another example, an evolved Node B (eNodeB) may refrain from configuring a UE with a CC over which parallel transmission is prohibited (at least as a primary CC or other CC that supports control data transmissions).

In either example, where the primary CC is a CC over which parallel transmission of control channel and data channel cannot be performed, the UE can transmit the control channel only, or can transmit the data channel only. In the latter case, for example, the UE can transmit control information over the data channel.

According to an example, a method for communicating over a plurality of component carriers in a wireless network is provided. The method includes obtaining configuration information for the plurality of component carriers configured by one or more cells, receiving an indication to perform parallel transmission of a control channel and a data channel with the one or more cells, determining whether the parallel transmission is supported over at least one component carrier of the plurality of component carriers, and transmitting at least one of the control channel, the data channel, or a combination thereof, over the at least one component carrier based at least in part on the indication to perform the parallel transmission and based at least in part on determining whether the parallel transmission is supported over the at least one component carrier.

In some examples, the method may also include wherein transmitting at least one of the control channel, the data channel, or the combination thereof comprises transmitting either the control channel or the data channel based on determining that parallel transmission is not supported over the at least one component carrier. The method may further include wherein transmitting at least one of the control channel, the data channel, or the combination thereof comprises transmitting the data channel based on determining that parallel transmission is not supported over the at least one component carrier, and further including transmitting control data over the data channel. The method may also include determining that the data channel is not scheduled to be transmitted over the at least one component carrier, and identifying a second data channel over a second component carrier from the plurality of component carriers, wherein transmitting comprises transmitting the control channel over the at least one component carrier, and further comprising transmitting the second data channel over the second component carrier.

Moreover, the method may include transmitting at least a portion of control data using the second data channel over the second component carrier. The method may also include wherein the configuration information relates to configuring the plurality of component carriers over a first cell group and a second cell group in dual connectivity, and wherein the at least one component carrier is configured as a primary component carrier for one of the first cell group or the second cell group. Further, the method may include wherein the configuration information relates to configuring the plurality of component carriers over a first cell group and a second cell group in dual connectivity, and wherein the at least one component carrier is prohibited from being configured as a primary component carrier for one of the first cell group or the second cell group. The method may also include wherein the configuration information relates to configuring the plurality of component carriers with a first cell in carrier aggregation, and wherein the at least one component carrier is configured as a primary component carrier. The method may additionally include wherein the configuration information relates to configuring the plurality of component carriers with a first cell in carrier aggregation, and wherein the at least one component carrier is prohibited from being configured as a primary component carrier. Also, the method may include wherein the configuration information relates to configuring the plurality of component carriers over a first cell group and a second cell group in carrier aggregation, and wherein the at least one component carrier is configured as a primary component carrier for one of the first cell group or the second cell group. Furthermore, the method may include wherein the configuration information relates to configuring the plurality of component carriers over a first cell group and a second cell group in carrier aggregation, and wherein the at least one component carrier is prohibited from being configured as a primary component carrier for one of the first cell group or the second cell group. The method may also include wherein determining whether parallel transmission is supported over the at least one component carrier comprises determining whether non-contiguous resource allocations are supported over the at least one component carrier.

In another example, a user equipment for communicating over a plurality of component carriers in a wireless network is provided. The user equipment may include a transceiver, at least one processor communicatively coupled with the transceiver via a bus for communicating signals in a wireless network, and a memory communicatively coupled with the at least one processor and/or the transceiver via the bus. The at least one processor and the memory are operable to obtain configuration information for the plurality of component carriers configured by one or more cells, receive an indication to perform parallel transmission of a control channel and a data channel with the one or more cells, determine whether the parallel transmission is supported over at least one component carrier of the plurality of component carriers, and transmit at least one of the control channel, the data channel, or a combination thereof, over the at least one component carrier based at least in part on the indication to perform the parallel transmission and based at least in part on determining whether the parallel transmission is supported over the at least one component carrier.

The user equipment may also include wherein the at least one processor and the memory are operable to transmit either the control channel or the data channel based on determining that parallel transmission is not supported over the at least one component carrier. The user equipment may further include wherein the at least one processor and the memory are operable to transmit the data channel based on determining that parallel transmission is not supported over the at least one component carrier, and wherein the at least one processor and the memory are further operable to transmit control data over the data channel. Moreover, the at least one processor and the memory may be further operable to determine that the data channel is not scheduled to be transmitted over the at least one component carrier, and identify a second data channel over a second component carrier from the plurality of component carriers, wherein the at least one processor and the memory are operable to transmit the control channel over the at least one component carrier, and further operable to transmit the second data channel over the second component carrier.

Additionally, the user equipment may include wherein the at least one processor and the memory are further operable to transmit at least a portion of control data using the second data channel over the second component carrier. The user equipment may also include wherein the configuration information relates to configuring the plurality of component carriers over a first cell group and a second cell group in dual connectivity, and wherein the at least one component carrier is configured as a primary component carrier for one of the first cell group or the second cell group. Further, the user equipment may include wherein the configuration information relates to configuring the plurality of component carriers over a first cell group and a second cell group in dual connectivity, and wherein the at least one component carrier is prohibited from being configured as a primary component carrier for one of the first cell group or the second cell group. The user equipment may also include wherein the configuration information relates to configuring the plurality of component carriers with a first cell in carrier aggregation, and wherein the at least one component carrier is configured as a primary component carrier. The user equipment may further include wherein the configuration information relates to configuring the plurality of component carriers with a first cell in carrier aggregation, and wherein the at least one component carrier is prohibited from being configured as a primary component carrier. Moreover, the user equipment may include wherein the configuration information relates to configuring the plurality of component carriers over a first cell group and a second cell group in carrier aggregation, and wherein the at least one component carrier is configured as a primary component carrier for one of the first cell group or the second cell group. The user equipment may also include wherein the configuration information relates to configuring the plurality of component carriers over a first cell group and a second cell group in carrier aggregation, and wherein the at least one component carrier is prohibited from being configured as a primary component carrier for one of the first cell group or the second cell group. The user equipment may additionally include wherein the at least one processor and the memory are operable to determine whether parallel transmission is supported over the at least one component carrier at least in part by determining whether non-contiguous resource allocations are supported over the at least one component carrier.

In yet another example, a user equipment for communicating over a plurality of component carriers in a wireless network is provided. The user equipment may include means for obtaining configuration information for the plurality of component carriers configured by one or more cells, means for receiving an indication to perform parallel transmission of a control channel and a data channel with the one or more cells, means for determining whether the parallel transmission is supported over at least one component carrier of the plurality of component carriers, and means for transmitting at least one of the control channel, the data channel, or a combination thereof, over the at least one component carrier based at least in part on the indication to perform the parallel transmission and based at least in part on determining whether the parallel transmission is supported over the at least one component carrier.

The user equipment may also include wherein the means for transmitting transmits either the control channel or the data channel based on determining that parallel transmission is not supported over the at least one component carrier. Further, for example, the user equipment may include wherein the means for transmitting transmits the data channel based on determining that parallel transmission is not supported over the at least one component carrier, and further comprising means for transmitting control data over the data channel.

In another example, a computer-readable storage medium comprising computer-executable code for communicating over a plurality of component carriers in a wireless network is provided. The code includes code for obtaining configuration information for the plurality of component carriers configured by one or more cells, code for receiving an indication to perform parallel transmission of a control channel and a data channel with the one or more cells, code for determining whether the parallel transmission is supported over at least one component carrier of the plurality of component carriers, and code for transmitting at least one of the control channel, the data channel, or a combination thereof, over the at least one component carrier based at least in part on the indication to perform the parallel transmission and based at least in part on determining whether the parallel transmission is supported over the at least one component carrier.

Additionally, the computer-readable storage medium may include wherein the code for transmitting transmits either the control channel or the data channel based on determining that parallel transmission is not supported over the at least one component carrier. Furthermore, the computer-readable storage medium may include wherein the code for transmitting transmits the data channel based on determining that parallel transmission is not supported over the at least one component carrier, and further comprising code for transmitting control data over the data channel.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
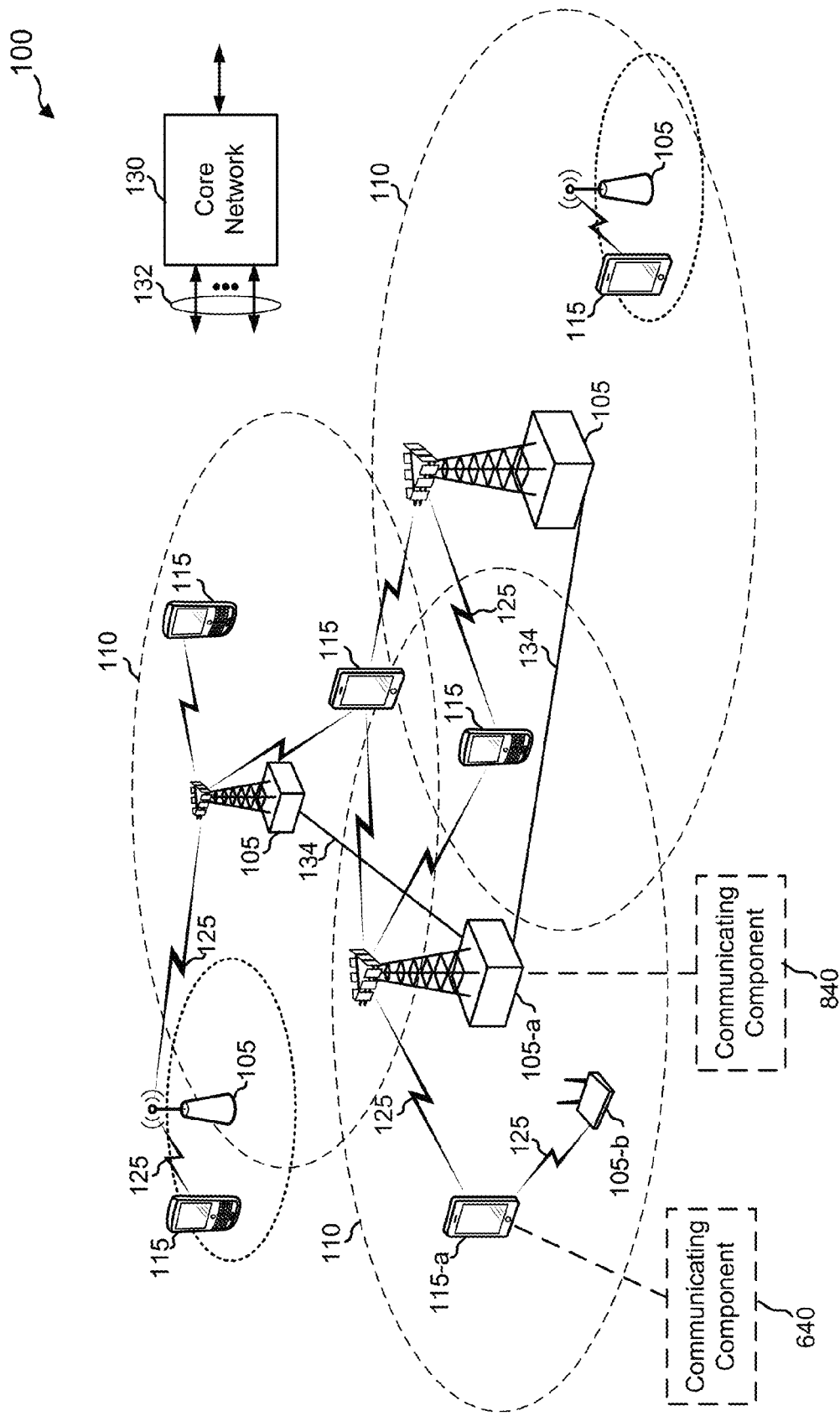
FIG. 1 is a block diagram conceptually illustrating an example of a wireless communications system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various techniques including methods, apparatuses, devices, and systems are described for communicating control and data channels over one or more component carriers (CC). In some aspects, a wireless device (e.g., user equipment (UE)) can communicate with one or more cells over a plurality of CCs, where the CCs may be configured with at least one network entity (e.g., evolved Node B (eNodeB)) in carrier aggregation (CA) and/or with multiple network entities in multiple connectivity. In multiple connectivity, it is to be appreciated that the UE may be configured with multiple carriers in CA with one or more of the multiple cells using one or more communication links to the one or more cells. In some aspects, in multiple connectivity, a wireless device may receive first configuration information to communicate with a first primary cell (e.g., a master cell group (MCG)/primary cell group (PCG) primary cell or PCell) of a first network entity over a first communication link. The wireless device may also receive second configuration information to communicate with a second primary cell (e.g., a secondary cell group (SCG) primary cell or $PCell_{SCG}$) of a second network entity over a second communication link. In the case of multiple connectivity, the PCells may be configured by different eNodeBs (e.g., a master eNodeB or MeNodeB that provides the PCell, and a secondary eNodeB or SeNodeB that provides the $PCell_{SCG}$).

In addition, the wireless device may be generally configured to perform parallel transmissions over a control channel and a data channel, but may not be able to support this functionality over a specific CC due to limitations related to the configuration of the CC. Accordingly, where the wireless device is configured with a CC for which it is unable to support parallel transmissions of the control and data channel, the wireless device may disable such parallel transmissions altogether. In another example, the wireless device may continue to support parallel transmission of the control and data channel, but may restrict transmissions over the CC that is unable to support the parallel transmissions by transmitting one of the control channel or data channel in a given period of time. It is to be appreciated, in this example, that parallel transmission of the control and data channel can still be supported by transmitting one of the control channel or data channel over the CC, and transmitting the other of the control or data channel over another CC. In yet another example, if the network entity configuring the carriers is aware of the UE's in ability to support parallel transmission over a given CC, the network entity can avoid scheduling the CC as a CC over which control channel and data channel transmissions are supported (e.g., a primary CC in CA or multiple connectivity).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

FIG. 1 is a block diagram conceptually illustrating an example of a wireless communications system 100, in accordance with an aspect of the present disclosure. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various embodiments. One or more UEs 115 can include a communicating component 640 for transmitting a control channel and/or a data channel over a CC based at least in part on determining whether parallel transmissions are supported over the CC, as described herein. One or more of the base stations 105 may include a communicating component 840 for generating a CC configuration for the one or more UEs 115, as described herein. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc. The wireless communications system 100 may also support operation on multiple flows at the same time. In some aspects, the multiple flows may correspond to multiple wireless wide area networks (WWANs) or cellular flows. In other aspects, the multiple flows may correspond to a combination of WWANs or cellular flows and wireless local area networks (WLANs) or Wi-Fi flows.

The base stations 105 may wirelessly communicate with the UEs 115 via one or more base station antennas. Each of the base stations 105 sites may provide communication coverage for a respective geographic coverage area 110. In some embodiments, base stations 105 may be referred to as a base transceiver station, a radio base station, an access point, a radio transceiver, a basic service set (BSS), an extended service set (ESS), a NodeB, eNodeB, Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In implementations, the wireless communications system 100 is an LTE/LTE-A network communication system. In LTE/LTE-A network communication systems, the terms evolved Node B (eNodeB) may be used to describe the base stations 105. The wireless communications system 100 may be a Heterogeneous LTE/LTE-A network in which different types of eNodeBs provide coverage for various geographical regions. For example, each eNodeB 105 may provide communication coverage for a macro cell, a pico cell, a femto cell, and/or other types of cell. A macro cell may cover a relatively large geographic area (e.g., several kilometers in radius) and may allow unrestricted access by UEs 115 with service subscriptions with the network provider. A pico cell may cover a relatively smaller geographic area (e.g., buildings) and may allow unrestricted access by UEs 115 with service subscriptions with the network provider. A femto cell may also cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNodeB 105 for a macro cell may be referred to as a macro eNodeB. An eNodeB 105 for a pico cell may be referred to as a pico eNodeB. And, an eNodeB 105 for a femto cell may be referred to as a femto eNodeB or a home eNodeB. An eNodeB 105 may support one or multiple (e.g., two, three, four, and the like) cells. The wireless communications system 100 may support use of LTE and WLAN or Wi-Fi by one or more of the UEs 115.

The core network 130 may communicate with the eNodeBs 105 or other base stations 105 via first backhaul links 132 (e.g., S1 interface, etc.). The eNodeBs 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the eNodeBs 105 may have similar frame timing, and transmissions from different eNodeBs 105 may be approximately aligned in time. For asynchronous operation, the eNodeBs 105 may have different frame timing, and transmissions from different eNodeBs 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macro eNodeBs, pico eNodeBs, femto eNodeBs, relays, and the like.

The communication links 125 shown in the wireless communications system 100 may include uplink (UL) transmissions from a UE 115 to an eNodeB 105, and/or downlink (DL) transmissions, from an eNodeB 105 to a UE 115. The downlink transmissions may also be called forward link transmissions while the uplink transmissions may also be called reverse link transmissions.

In certain aspects of the wireless communications system 100, a UE 115 may be configured to support carrier aggregation (CA) or multiple connectivity with two or more cells provided by one or more eNodeBs 105. The eNodeBs 105 that are used for CA/multiple connectivity may be collocated or may be connected through fast connections and/or non-collocated. In either case, coordinating the aggregation of CCs for wireless communications between the UE 115 and the one or more eNodeBs 105 may be carried out more easily because information can be readily shared between the various cells being used to perform the carrier aggregation. When the eNodeBs 105 that are used for carrier aggregation are non-collocated (e.g., far apart or do not have a high-speed connection between them), then coordinating the aggregation of component carriers may involve additional aspects. For example, in carrier aggregation for dual connectivity (e.g., UE 115 connected to two non-collocated eNodeBs 105), the UE 115 may receive configuration information to communicate with a first eNodeB 105 (e.g., secondary eNodeB (SeNodeB or SeNB)) through a primary cell of the first eNodeB 105. The first eNodeB 105 may include a group of cells referred to as a secondary cell group or SCG, which includes one or more secondary cells and the primary cell or $PCell_{SCG}$ of the first eNodeB 105. The UE 115 may also receive configuration information to communicate with a second eNodeB 105 (e.g., master eNodeB (MeNodeB or MeNB)) through a second primary cell of the second eNodeB 105. The second eNodeB 105 may include a group of cells referred to as a master cell group or MCG, which includes one or more secondary cells and the primary cell or $PCell_{MCG}$ of the second eNodeB 105.

In certain aspects of the wireless communications system 100, carrier aggregation for dual connectivity may involve having a secondary eNodeB 105 (e.g., SeNodeB or SeNB) be configured to operate one of its cells as a $PCell_{SCG}$. The secondary eNodeB 105 may transmit, to a UE 115, configuration information through the $PCell_{SCG}$ for the UE 115 to communicate with the secondary eNodeB 105 while the UE 115 is in communication with a master eNodeB 105 (e.g., MeNodeB or MeNB). Similarly, the UE 115 may transmit uplink control information for the SCG to the $PCell_{SCG}$. The master eNodeB 105 may transmit, to the same UE 115, configuration information via its $PCell_{MCG}$ for that UE 115 to communicate with the other eNodeB 105. Similarly, the UE 115 may transmit uplink control information for the MCG to the PCell. The two eNodeBs 105 may be non-collocated.

In examples described herein, UE 115 can be configured for transmitting control and data channels over the multiple CCs, whether the multiple CCs are configured in CA and/or multiple connectivity. For example, UE 115 may be generally configured to perform parallel transmission of the control channel and data channel over a configured baseband, but may be restricted from parallel transmissions of different channels on a configured CC (e.g., over a related frequency band). In this case, the UE 115 may not perform parallel transmissions of the control and data channels over the CC. Accordingly, in one example, when UE 115 is configured with a primary CC (PCC) over which it cannot perform parallel control channel and data channel transmissions, UE 115 can disable the functionality of performing parallel transmissions of control and data channels over all CCs of the communication link between UE 115 and a corresponding eNodeB 105 (and/or multiple communication links between UE 115 and multiple eNodeBs 105). In another example, when UE 115 is configured with a PCC over which it cannot perform parallel control channel and data channel transmissions, UE 115 can continue to generally support parallel transmissions of control and data channels over other CCs in the communication link, but may restrict this functionality over the PCC. In this example, the UE 115 may either transmit the control channel over the PCC, or transmit the data channel and transmit control information over the data channel in a given period of time. In yet another example, an eNodeB 105 can refrain from configuring UE 115 with a PCC (or at least another CC that supports control data transmissions) over which parallel transmission is prohibited.

Figure 2:
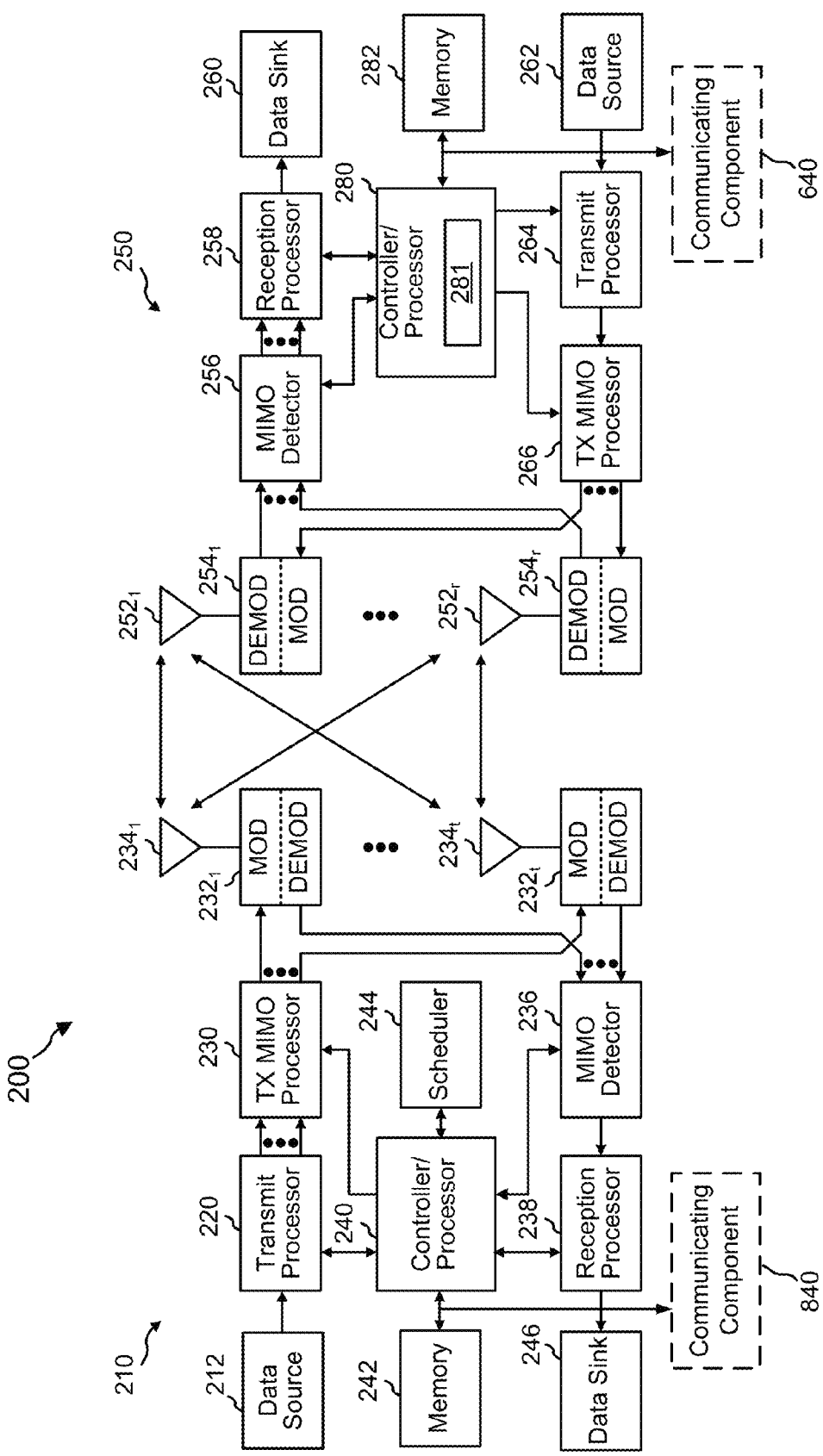
FIG. 2 is a block diagram conceptually illustrating examples of an eNodeB and a user equipment (UE) configured in accordance with various aspects of the present disclosure.

FIG. 2 is a block diagram conceptually illustrating examples of an eNodeB 210 and a UE 250 configured in accordance with an aspect of the present disclosure. For example, the base station/eNodeB 210 and the UE 250 of a system 200, as shown in FIG. 2, may be one of the base stations/eNodeBs and one of the UEs in FIG. 1, respectively. UE 250 can include a communicating component 640 for transmitting a control channel and/or a data channel over a CC based at least in part on determining whether parallel transmissions are supported over the CC, as described herein, which is shown as coupled to controller/processor 281 and/or memory 282 and can be implemented by controller/processor 281, stored in memory 282 as a set of instructions, etc. eNodeB 210 may include a communicating component 840 for generating a CC configuration for the one or more UEs 250, as described herein, which is shown as coupled to controller/processor 240 and/or memory 242 and can be implemented by controller/processor 240, stored in memory 242 as a set of instructions, etc. In some aspects, the eNodeB 210 may support carrier aggregation and/or multiple connectivity (e.g., dual connectivity) carrier aggregation, etc. For example, the eNodeB 210 may be an MeNodeB or MeNB having one of the cells in its MCG configured as a $PCell_{MCG}$ or an SeNodeB or SeNB having one of its cells in its SCG configured as a $PCell_{SCG}$. In some aspects, the UE 250 may also support multiple connectivity carrier aggregation. The UE 250 may receive configuration information from the eNodeB 210 via the $PCell_{MCG}$ and/or the $PCell_{SCG}$. The base station 210 may be equipped with antennas $234_{1-t}$, and the UE 250 may be equipped with antennas $252_{1-r}$, wherein t and r are integers greater than or equal to one.

At the base station 210, a base station transmit processor 220 may receive data from a base station data source 212 and control information from a base station controller/processor 240. The control information may be carried on the PBCH, PCFICH, physical hybrid automatic repeat/request (HARQ) indicator channel (PHICH), PDCCH, etc. The data may be carried on the PDSCH, etc. The base station transmit processor 220 may process (e.g., encode and symbol map) the data and control information to obtain data symbols and control symbols, respectively. The base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to the base station modulators/demodulators (MODs/DEMODs) $232_{1-t}$. Each base station modulator/demodulator 232 may process a respective output symbol stream (e.g., for OFDM, etc.) to obtain an output sample stream. Each base station modulator/demodulator 232 may further process (e.g., convert to analog, amplify, filter, and upconvert) the output sample stream to obtain a downlink signal. Downlink signals from modulators/demodulators $232_{1-t}$ may be transmitted via the antennas $234_{1-t}$, respectively.

At the UE 250, the UE antennas $252_{1-r}$ may receive the downlink signals from the base station 210 and may provide received signals to the UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all the UE modulators/demodulators $254_{1-r}$, and perform MIMO detection on the received symbols if applicable, and provide detected symbols. A UE reception processor 258 may process (e.g., demodulate, deinterleave, and decode) the detected symbols, provide decoded data for the UE 250 to a UE data sink 260, and provide decoded control information to a UE controller/processor 280.

On the uplink, at the UE 250, a UE transmit processor 264 may receive and process data (e.g., for the physical uplink shared channel (PUSCH)) from a UE data source 262 and control information (e.g., for the physical uplink control channel (PUCCH)) from the UE controller/processor 280. The UE transmit processor 264 may also generate reference symbols for a reference signal. The symbols from the UE transmit processor 264 may be precoded by a UE TX MIMO processor 266 if applicable, further processed by the UE modulator/demodulators $254_{1-r}$ (e.g., for SC-FDM, etc.), and transmitted to the base station 210. At the base station 210, the uplink signals from the UE 250 may be received by the base station antennas 234, processed by the base station modulators/demodulators 232, detected by a base station MIMO detector 236 if applicable, and further processed by a base station reception processor 238 to obtain decoded data and control information sent by the UE 250. The base station reception processor 238 may provide the decoded data to a base station data sink 246 and the decoded control information to the base station controller/processor 240.

The base station controller/processor 240 and the UE controller/processor 280 may direct the operation at the base station 210 and the UE 250, respectively. The UE controller/processor 280 and/or other processors and modules at the UE 250 may also perform or direct, e.g., the execution of the functional blocks illustrated in FIGS. 6, 8, etc. and/or other processes for the techniques described herein (e.g., flowcharts illustrated in FIGS. 7, 9, etc.). In some aspects, at least a portion of the execution of these functional blocks and/or processes may be performed by block 281 in the UE controller/processor 280. The base station memory 242 and the UE memory 282 may store data and program codes for the base station 210 and the UE 250, respectively. For example, the UE memory 282 may store configuration information for multiple connectivity wireless communications provided by the base station 210 and/or another base station. A scheduler 244 may be used to schedule UE 250 for data transmission on the downlink and/or uplink.

In one configuration, the UE 250 may include means for obtaining configuration information for the plurality of component carriers configured by one or more cells. The UE 250 may also include means for receiving an indication to perform parallel transmission of a control channel and a data channel with the one or more cells. The UE 250 can additionally include means for determining whether the parallel transmission is supported over at least one component carrier of the plurality of component carriers. Also, the UE 250 may include means for transmitting at least one of the control channel, the data channel, or a combination thereof, over the at least one component carrier based at least in part on the indication to perform the parallel transmission and based at least in part on determining whether the parallel transmission is supported or not supported over the at least one component carrier. In one aspect, the aforementioned means may be or may include the UE controller/processor 280, the UE memory 282, the UE reception processor 258, the UE MIMO detector 256, the UE modulators/demodulators 254, and/or the UE antennas 252 configured to perform the functions recited by the aforementioned means. In another aspect, the aforementioned means may be a module, component, or any apparatus configured to perform the functions recited by the aforementioned means. Examples of such modules, components, or apparatus may be described with respect to FIGS. 6, 8, etc.

Figure 3:
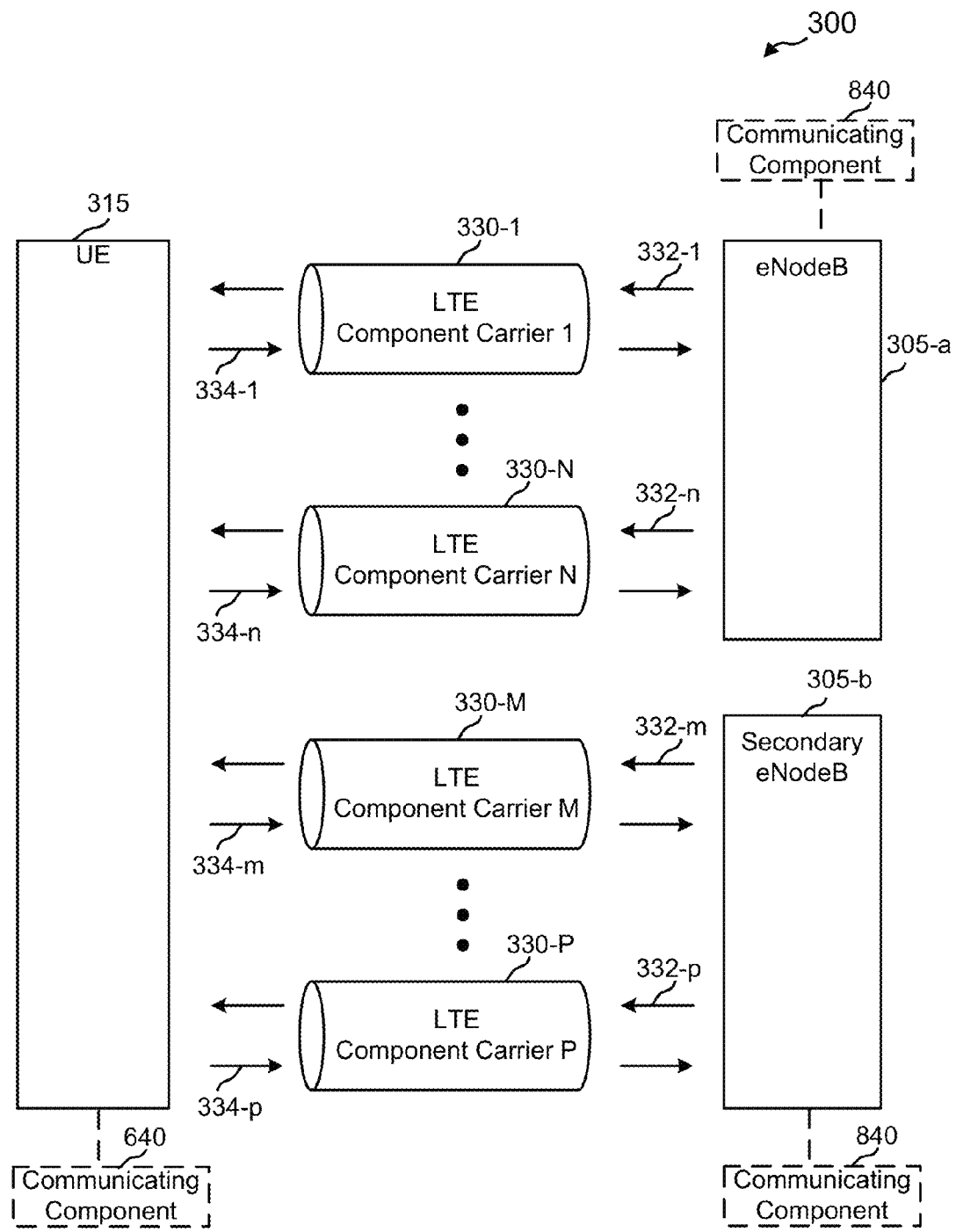
FIG. 3 is a block diagram conceptually illustrating an aggregation of radio access technologies at a UE, in accordance with various aspects of the present disclosure.

FIG. 3 is a block diagram conceptually illustrating an aggregation of carriers and/or communication links at a UE, in accordance with an aspect of the present disclosure. The aggregation may occur in a system 300 including a multi-mode UE 315, which can communicate with an eNodeB 305-$a$ using one or more component carriers 1 through N ($CC_1$-$CC_N$), and/or with a secondary eNodeB 305-$b$ using one or more component carriers M through P ($CC_M$-$CC_P$). For example, the eNodeB 305-$a$ and/or secondary eNodeB 305-$b$ may include an AP, femto cell, pico cell, etc. UE 315 can include a communicating component 640 for transmitting a control channel and/or a data channel over a CC based at least in part on determining whether parallel transmissions are supported over the CC, as described herein. eNodeB 305-$a$ and/or 305-$b$ may include a communicating component 840 for generating a CC configuration for the one or more UEs 315, as described herein. UE 315 may be a multi-mode UE in this example that supports more than one radio access technology (RAT). For example, the UE 315 may support at least a WWAN radio access technology (e.g., LTE) and/or a WLAN radio access technology (e.g., Wi-Fi). A multi-mode UE may also support carrier aggregation and/or multiple connectivity carrier aggregation as described herein. The UE 315 may be an example of one of the UEs of FIG. 1, FIG. 2, FIG. 4, FIG. 5, FIG. 6, FIG. 8. The eNodeB 305-$a$ and/or secondary eNodeB 305-$b$ may be an example of one of the eNodeBs or base stations of FIG. 1, FIG. 2, FIG. 4, FIG. 5, FIG. 6, FIG. 8. While only one UE 315, one eNodeB 305-$a$, and one secondary eNodeB 305-$b$ are illustrated in FIG. 3, it will be appreciated that the system 300 can include any number of UEs 315, eNodeBs 305-$a$, and/or secondary eNodeBs 305-$b$. In one example, UE 315 can communicate with one eNodeB 305-$a$ over one or more LTE component carriers 330-1 to 330-N while communicating with another eNodeB 305-$b$ over another one or more component carriers 330M to 330-P.

The eNodeB 305-$a$ can transmit information to the UE 315 over forward (downlink) channels 332-1 through 332-N on LTE component carriers $CC_1$ through $CC_N$ 330. In addition, the UE 315 can transmit information to the eNodeB 305-$a$ over one or more reverse (uplink) channels 334-1 through 334-N on LTE component carriers $CC_1$ through $CC_N$. Similarly, the eNodeB 305-$b$ may transmit information to the UE 315 over one or more forward (downlink) channels 332-$m$ through 332-$p$ on one or more LTE component carriers $CC_M$ through $CC_P$ 330. In addition, the UE 315 may transmit information to the eNodeB 305-$b$ over one or more reverse (uplink) channels 334-$m$ through 334-$p$ on one or more LTE component carriers $CC_M$ through $CC_P$ 330.

In describing the various entities of FIG. 3, as well as other figures associated with some of the disclosed embodiments, for the purposes of explanation, the nomenclature associated with a 3GPP LTE or LTE-A wireless network is used. However, it is to be appreciated that the system 300 can operate in other networks such as, but not limited to, an OFDMA wireless network, a CDMA network, a 3GPP2 CDMA2000 network and the like.

In multi-carrier operations, the downlink control information (DCI) messages associated with different UEs 315 can be carried on multiple component carriers. For example, the DCI on a PDCCH can be included on the same component carrier that is configured to be used by a UE 315 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling). Similarly, uplink control information (UCI) messages from a UE 315 can be transmitted using a control channel (e.g., PUCCH) carried on one of the CCs configured as a primary CC, or on a data channel (e.g., PUSCH) carried on the primary CC or one or more secondary CCs.

Figure 4:
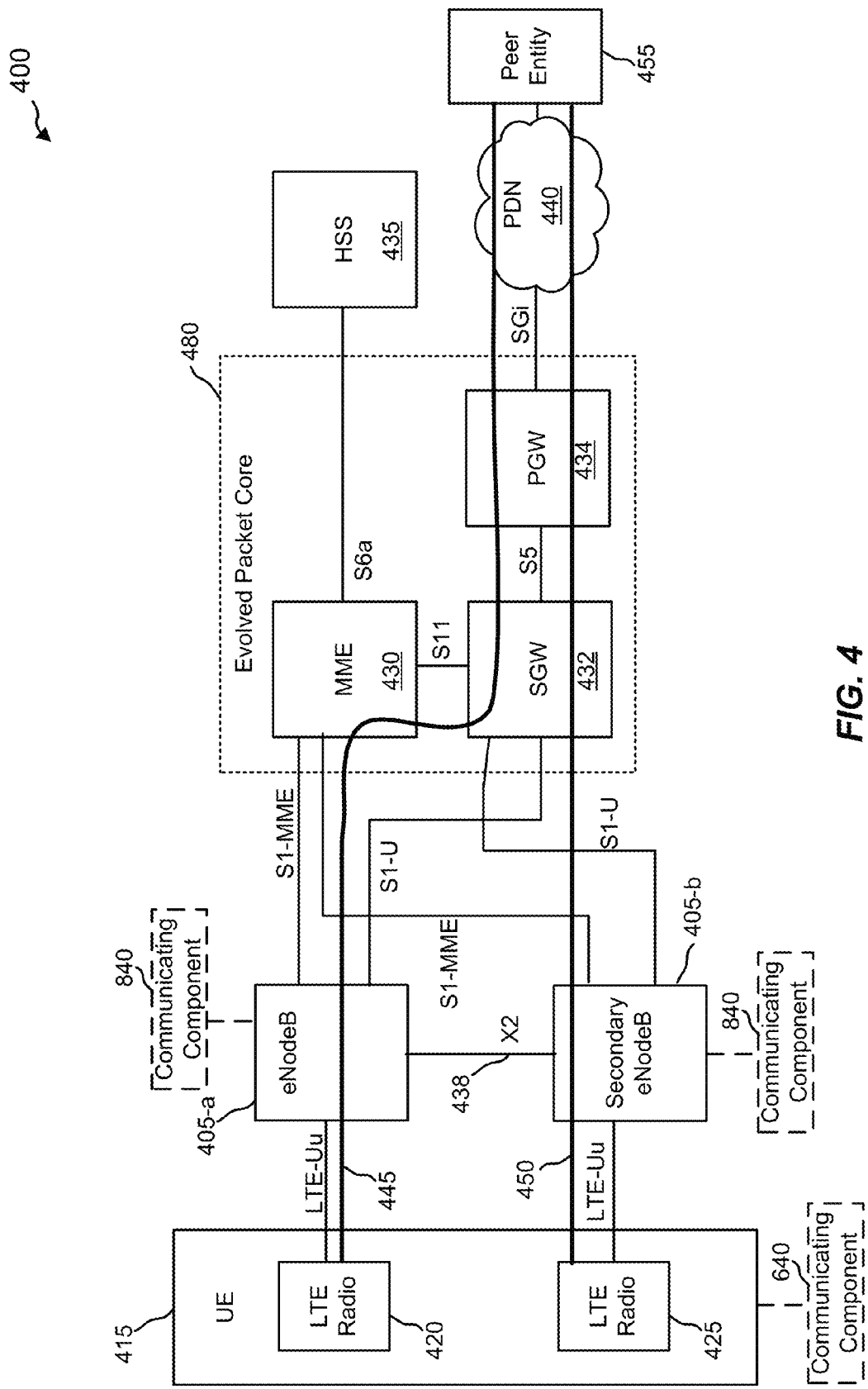
FIG. 4 is a block diagram conceptually illustrating an example of data paths between a UE and a PDN, in accordance with various aspects of the present disclosure.

In the present example, the UE 315 may receive data from one eNodeB 305-$a$. However, users on a cell edge may experience high inter-cell interference which may limit the data rates. Multiflow allows UEs to receive data from two eNodeBs 305-$a$ and 305-$b$ concurrently. In some aspects, the two eNodeBs 305-$a$ may be non-collocated and may be configured to support multiple connectivity carrier aggregation. Multiflow works by sending and receiving data from the two eNodeBs 305-$a$/305-$b$ in two totally separate streams when a UE is in range of two cell towers in two adjacent cells at the same time (see FIG. 5 below). The UE talks to two eNodeB 305-$a$ and/or 305-$b$ simultaneously when the device is on the edge of either eNodeBs' reach. By scheduling two independent data streams to the mobile device from two different eNodeBs at the same time, multiflow exploits uneven loading in wireless communication networks. This helps improve the cell edge user experience while increasing network capacity. In one example, throughput data speeds for users at a cell edge may double. In some aspects, multiflow may also refer to the ability of a UE to talk to a WWAN tower (e.g., cellular tower) and a WLAN tower (e.g., AP) simultaneously when the UE is within the reach of both towers. In such cases, the towers may be configured to support carrier aggregation through multiple connections when the towers are not collocated. FIG. 4 is a block diagram conceptually illustrating an example of data paths 445 and 450 between a UE 415 and a PDN 440 (e.g., Internet or one or more components to access the Internet) in accordance with an aspect of the present disclosure. The data paths 445, 450 are shown within the context of a wireless communications system 400 for aggregating data from different eNodeBs 405-$a$ and 405-$b$, which may or may not use the same RAT. The system 200 of FIG. 2 may be an example of portions of the wireless communications system 400. The wireless communications system 400 may include a multi-mode UE 415, an eNodeB 405-$a$, a secondary eNodeB 405-$b$ that can be coupled to the eNodeB 405-$a$ via a backhaul link 438 (e.g., based on a X2 interface), an evolved packet core (EPC) 480, a PDN 440, and a peer entity 455. UE 415 can include a communicating component 640 for transmitting a control channel and/or a data channel over a CC based at least in part on determining whether parallel transmissions are supported over the CC, as described herein. eNodeB 405-a and/or 405-b may include a communicating component 840 for generating a CC configuration for the one or more UEs 415, as described herein. The multi-mode UE 415 may be configured to support carrier aggregation, multiple connectivity (e.g., dual connectivity) carrier aggregation, and/or the like. The EPC 480 may include a mobility management entity (MME) 430, a serving gateway (SGW) 432, and a PDN gateway (PGW) 434. A home subscriber system (HSS) 435 may be communicatively coupled with the MME 430. The UE 415 may include an LTE radio 420 and/or 425, though it is to be appreciated that the same LTE radio can be used to communicate with both eNodeB 405-a and 405-b in one example. These elements may represent aspects of one or more of their counterparts described above with reference to the previous or subsequent Figures. For example, the UE 415 may be an example of UEs in FIG. 1, FIG. 2, FIG. 3, FIG. 5, FIG. 6, FIG. 8, the eNodeB 405-a may be an example of the eNodeBs/base stations of FIG. 1 or FIG. 2, eNodeB 305-a of FIG. 3, MeNodeB 505-a of FIG. 5, MeNodeB 605-a of FIG. 6, network entity 805-a of FIG. 8, etc., the secondary eNodeB 405-b may be an example of the secondary eNodeB 305-b of FIG. 3, SeNodeB 505-b of FIG. 5, SeNodeB 605-b of FIG. 6, or network entity 805-b of FIG. 8, etc., and/or the EPC 480 may be an example of the core network of FIG. 1. The eNodeBs 405-a and/or 405-b in FIG. 4 may be not be collocated or otherwise may not be in high-speed communication with each other. In addition, in an example, eNodeBs 405-a and 405-b may communicate with different EPCs 480.

Referring back to FIG. 4, the eNodeB 405-a and the eNodeB 405-b may be capable of providing the UE 415 with access to the PDN 440 using the aggregation of one or more LTE component carriers (e.g., with one or more eNodeBs). Accordingly, the UE 415 may involve carrier aggregation in dual connectivity, where one connection is to one network entity (eNodeB 405-a) and the other connection is to a different network entity (eNodeB 405-b). It is to be appreciated that UE 415 can communicate with additional eNodeBs 405-a and/or 405-b via additional communication data paths 445, 450 that traverse the EPC 480 or not to access PDN 440 to provide multiple connectivity wireless communications with multiple NodeBs, carrier aggregation with multiple cells of an eNodeB, etc. Using this access to the PDN 440, the UE 415 may communicate with the peer entity 455. The eNodeB 405-a and/or 405-b may provide access to the PDN 440 through the EPC 480 (e.g., through data path 445), and the eNodeB 405-b may provide direct access to the PDN 440 (e.g., through data path 450). In the depicted example of FIG. 4, the UE 415 can communicate with eNodeB 405-a as a MeNodeB and the eNodeB 405-b as a SeNodeB over eNodeB-specific bearers. In an example, eNodeBs 405-a and 405-b can communicate with one another over an X2 connection 438 to aggregate UE 415 communications for providing the EPC 480. In this example, UE 415 can access the PDN 440 by using the bearer with eNodeB 405-a and/or secondary eNodeB 405-b, which can map communications over the data paths 445 and 450 to access the PDN 440. Moreover, in this example, MeNodeB 405-a can provide UE-specific upper layer functionalities to the UE 415, such as non-access stratum (NAS) functions including NAS security, NAS mobility functions, etc. In addition, in this example, the SeNodeB 405-b can carry PUCCH for the SCG and provide other PCell-like lower layer functionalities for the SCG. Thus, the UE 415 can independently communicate with MeNodeB 405-a and SeNodeB 405-b.

The MME 430 may be the control node that processes the signaling between the UE 415 and the EPC 480. The MME 430 may provide bearer and connection management. The MME 430 may, therefore, be responsible for idle mode UE tracking and paging, bearer activation and deactivation, and SGW selection for the UE 415. The MME 430 may communicate with the eNodeBs 405-a and/or 405-b over an S1-MME interface. The MME 430 may additionally authenticate the UE 415 and implement Non-Access Stratum (NAS) signaling with the UE 415.

The HSS 435 may, among other functions, store subscriber data, manage roaming restrictions, manage accessible access point names (APNs) for a subscriber, and associate subscribers with MMEs 430. The HSS 435 may communicate with the MME 430 over an S6a interface defined by the Evolved Packet System (EPS) architecture standardized by the 3GPP organization.

All user IP packets transmitted over LTE may be transferred through eNodeBs 405-a and/or 405-b to the SGW 432, which may be connected to the PGW 434 over an S5 signaling interface and the MME 430 over an S11 signaling interface. The SGW 432 may reside in the user plane and act as a mobility anchor for inter-eNodeB handovers and handovers between different access technologies. The PGW 434 may provide UE IP address allocation as well as other functions.

The PGW 434 may provide connectivity to one or more external packet data networks, such as PDN 440, over an SGi signaling interface. The PDN 440 may include the Internet, an Intranet, an IP Multimedia Subsystem (IMS), a Packet-Switched (PS) Streaming Service (PSS), and/or other types of PDNs.

In the present example, user plane data between the UE 415 and the EPC 480 may traverse the same set of one or more EPS bearers, irrespective of whether the traffic flows over data path 445 of the LTE link or data path 450. Signaling or control plane data related to the set of one or more EPS bearers may be transmitted between the LTE radio 420 of the UE 415 and the MME 430 of the EPC 480, by way of the eNodeBs 405-a and/or 405-b.

While aspects of FIG. 4 have been described with respect to LTE, similar aspects regarding aggregation and/or multiple connections may also be implemented with respect to UMTS or other similar system or network wireless communications radio technologies.

Figure 5:
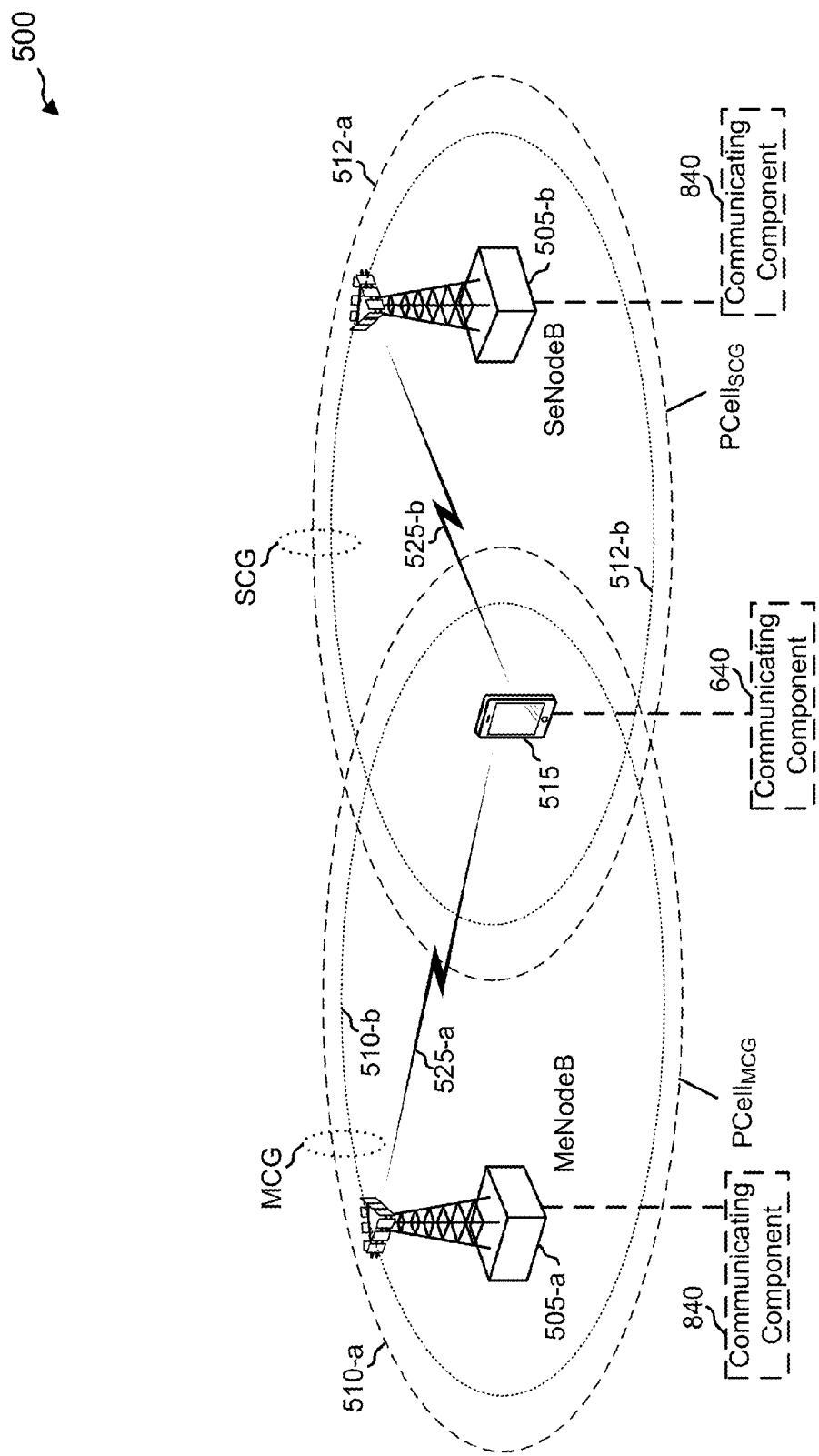
FIG. 5 is a diagram conceptually illustrating multiple connectivity carrier aggregation, in accordance with various aspects of the present disclosure.

FIG. 5 is a diagram conceptually illustrating multiple connectivity carrier aggregation, in accordance with an aspect of the present disclosure. A wireless communications system 500 may include a master eNodeB 505-a (MeNodeB or MeNB) having a set or group of cells referred to as a master cell group or MCG (or PCG) that may be configured to serve the UE 515. The MCG may include one primary cell (PCell$_{MCG}$) 510-a and one or more secondary cells 510-b (only one is shown). The wireless communications system 500 may also include a secondary eNodeB 505-b (SeNodeB or SeNB) having a set or group of cells referred to as a secondary cell group or SCG that may be configured to serve the UE 515. The SCG may include one primary cell (PCell$_{SCG}$) 512-a and one or more secondary cells 512-b (only one is shown). Also shown is a UE 515 that supports carrier aggregation for multiple connectivity wireless communications (e.g., dual connectivity). The UE 515 may communicate with the MeNodeB 505-a, or a related $PCell_{MCG}$, via communication link 525-a and with the SeNodeB 505-b, or a related $PCell_{SCG}$, via communication link 525-b. UE 515 can include a communicating component 640 for transmitting a control channel and/or a data channel over a CC based at least in part on determining whether parallel transmissions are supported over the CC, as described herein. eNodeB 505-a and/or 505-b may include a communicating component 840 for generating a CC configuration for the one or more UEs 515, as described herein.

In an example, the UE 515 may aggregate component carriers from the same eNodeB or may aggregate component carriers from collocated or non-collocated eNodeBs. In such an example, the various cells (e.g., different component carriers (CCs)) being used can be easily coordinated because they are either handled by the same eNodeB or by eNodeBs that can communicate control information. When the UE 515, as in the example of FIG. 5, performs carrier aggregation when in communication with two eNodeBs that are non-collocated, then the carrier aggregation operation may be different due to various network conditions. In this case, establishing a primary cell ($PCell_{SCG}$) in the secondary eNodeB 505-b may allow for appropriate configurations and controls to take place at the UE 515 even though the secondary eNodeB 505-b is non-collocated with the primary eNodeB 505-a.

In the example of FIG. 5, the carrier aggregation may involve certain functionalities by the $PCell_{MCG}$ of the MeNodeB 505-a. For example, the $PCell_{MCG}$ may handle certain functionalities such as physical uplink control channel (PUCCH), contention-based random access control channel (RACH), and semi-persistent scheduling to name a few. Carrier aggregation with dual or multiple connectivity wireless communications to non-collocated eNodeBs may involve having to make some enhancements and/or modifications to the manner in which carrier aggregation is otherwise performed. Some of the enhancements and/or modifications may involve having the UE 515 connected to the MeNodeB 505-a and to the SeNodeB 505-b as described above. Other features may include, for example, having a timer adjustment group (TAG) comprise cells of one of the eNodeBs, having contention-based and contention-free random access (RA) allowed on the SeNodeB 505-b, separate discontinuous reception (DRX) procedures for the MeNodeB 505-a and to the SeNodeB 505-b, having the UE 515 send a buffer status report (BSR) to the eNodeB where the one or more bearers (e.g., eNodeB specific or split bearers) are served, as well as enabling one or more of power headroom report (PHR), power control, semi-persistent scheduling (SPS), and logical channel prioritization in connection with the $PCell_{SCG}$ in the secondary eNodeB 505-b. The enhancements and/or modifications described above, and well as others provided in the disclosure, are intended for purposes of illustration and not of limitation.

For carrier aggregation in dual connectivity, different functionalities may be divided between the MeNodeB 505-a and the SeNodeB 505-b. For example, different functionalities may be statically divided between the MeNodeB 505-a and the SeNodeB 505-b or dynamically divided between the MeNodeB 505-a and the SeNodeB 505-b based on one or more network parameters. In an example, the MeNodeB 505-a may perform upper layer (e.g., above the media access control (MAC) layer) functionality via a $PCell_{MCG}$, such as but not limited to functionality with respect to initial configuration, security, system information, and/or radio link failure (RLF). As described in the example of FIG. 5, the $PCell_{MCG}$ may be configured as one of the cells of the MeNodeB 505-a that belong to the MCG. The $PCell_{MCG}$ may be configured to provide lower layer functionalities (e.g., MAC/PHY layer) within the MCG.

In an example, the SeNodeB 505-b may provide configuration information of lower layer functionalities (e.g., MAC/PHY layers) for the SCG. The configuration information may be provided by the $PCell_{SCG}$ as one or more radio resource control (RRC) messages, for example. The $PCell_{SCG}$ may be configured to have the lowest cell index (e.g., identifier or ID) among the cells in the SCG. For example, some of the functionalities performed by the SeNodeB 505-b via the $PCell_{SCG}$ may include carrying the PUCCH, configuring the cells in the SCG to follow the DRX configuration of the $PCell_{SCG}$, configure resources for contention-based and contention-free random access on the SeNodeB 505-b, carrying downlink (DL) grants having transmit power control (TPC) commands for PUCCH, estimating pathloss based on $PCell_{SCG}$ for other cells in the SCG, providing common search space for the SCG, and providing SPS configuration information for the UE 515.

In some aspects, the $PCell_{MCG}$ may be configured to provide upper level functionalities to the UE 515 such as security, connection to a network, initial connection, and/or radio link failure, for example. The $PCell_{MCG}$ may be configured to carry physical uplink control channel (PUCCH) for cells in the MCG, to include the lowest cell index among the MCG, to enable the MCG cells to have the same discontinuous reception (DRX) configuration, to configure random access resources for one or both of contention-based and contention-free random access on the MeNodeB 505-a, to enable downlink grants to convey transmit power control (TPC) commands for PUCCH, to enable pathloss estimation for cells in the MCG, to configure common search space for the MeNodeB 505-a, and/or to configure semi-persistent scheduling.

In some aspects, the $PCell_{SCG}$ may be configured to carry PUCCH for cells in the SCG, to include the lowest cell index among the SCG, to enable the SCG cells to have the same DRX configuration, to configure random access resources for one or both of contention-based and contention-free random access on the SeNodeB 505-b, to enable downlink grants to convey TPC commands for PUCCH, to enable pathloss estimation for cells in the SCG, to configure common search space for the SeNodeB 505-b, and/or to configure semi-persistent scheduling.

Returning to the example of FIG. 5, the UE 515 may support parallel PUCCH and physical uplink shared channel (PUSCH) configurations for the MeNodeB 505-a and/or the SeNodeB 505-b, though the UE 515 may not be able to provide parallel transmissions for the PUCCH and PUSCH on a given carrier based on a configuration for the carrier, as described further herein. In some cases, the UE 515 may use a configuration (e.g., UE 515 based) that may be applicable to both carrier groups. These PUCCH/PUSCH configurations may be provided through RRC messages, for example.

The UE 515 may also support parallel configuration for simultaneous transmission of acknowledgement (ACK)/negative acknowledgement (NACK) and channel quality indicator (CQI) and for ACK/NACK/sounding reference signal (SRS) for the MeNodeB 505-a and the SeNodeB 505-b. In some cases, the UE 515 may use a configuration (e.g., UE based and/or MCG or SCG based) that may be applicable to both carrier groups. These configurations may be provided through RRC messages, for example.

Figure 6:
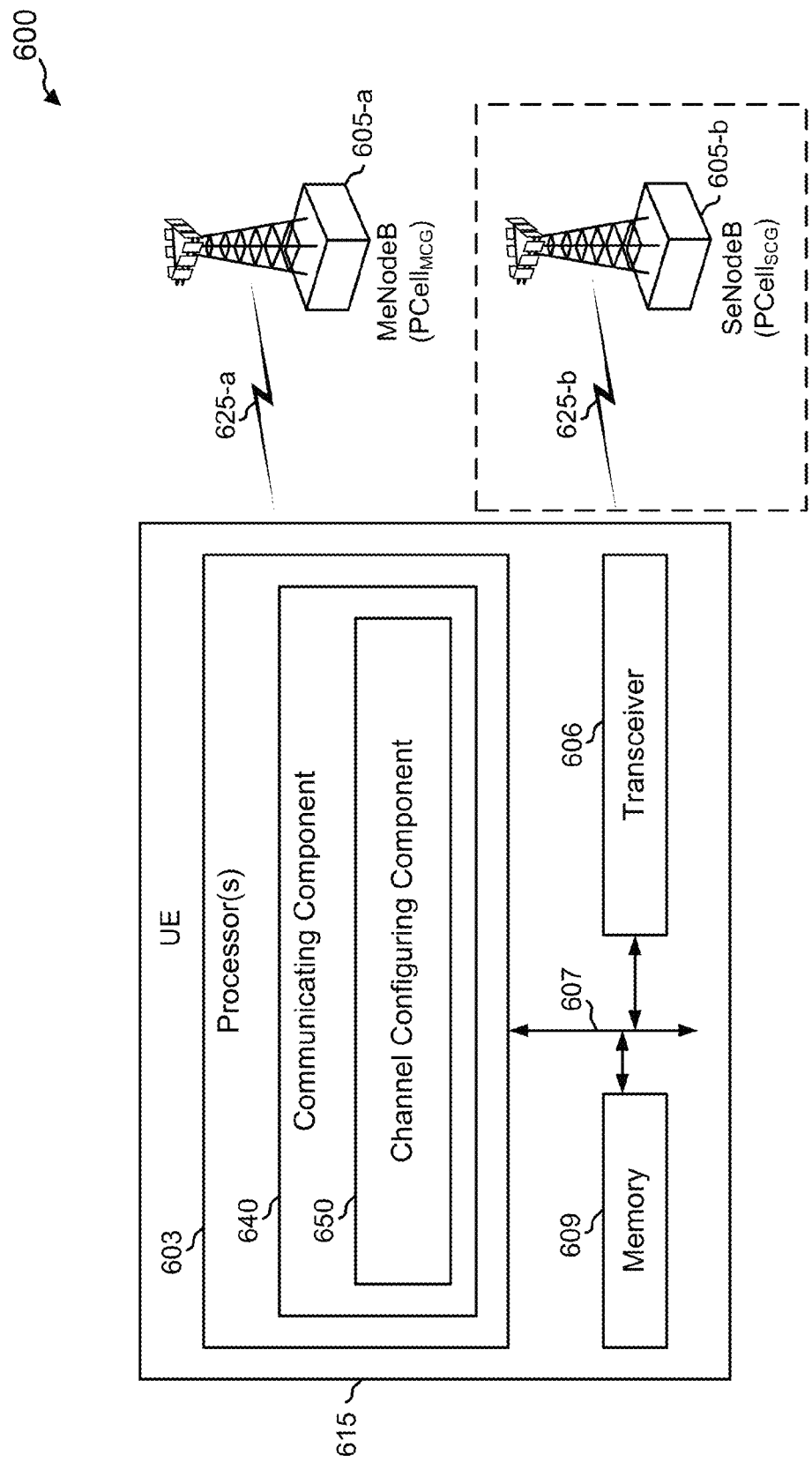
FIG. 6 is a block diagram conceptually illustrating an example of a UE configured to transmit control and/or data channels over one or more component carriers in accordance with various aspects of the present disclosure.
Figure 7:
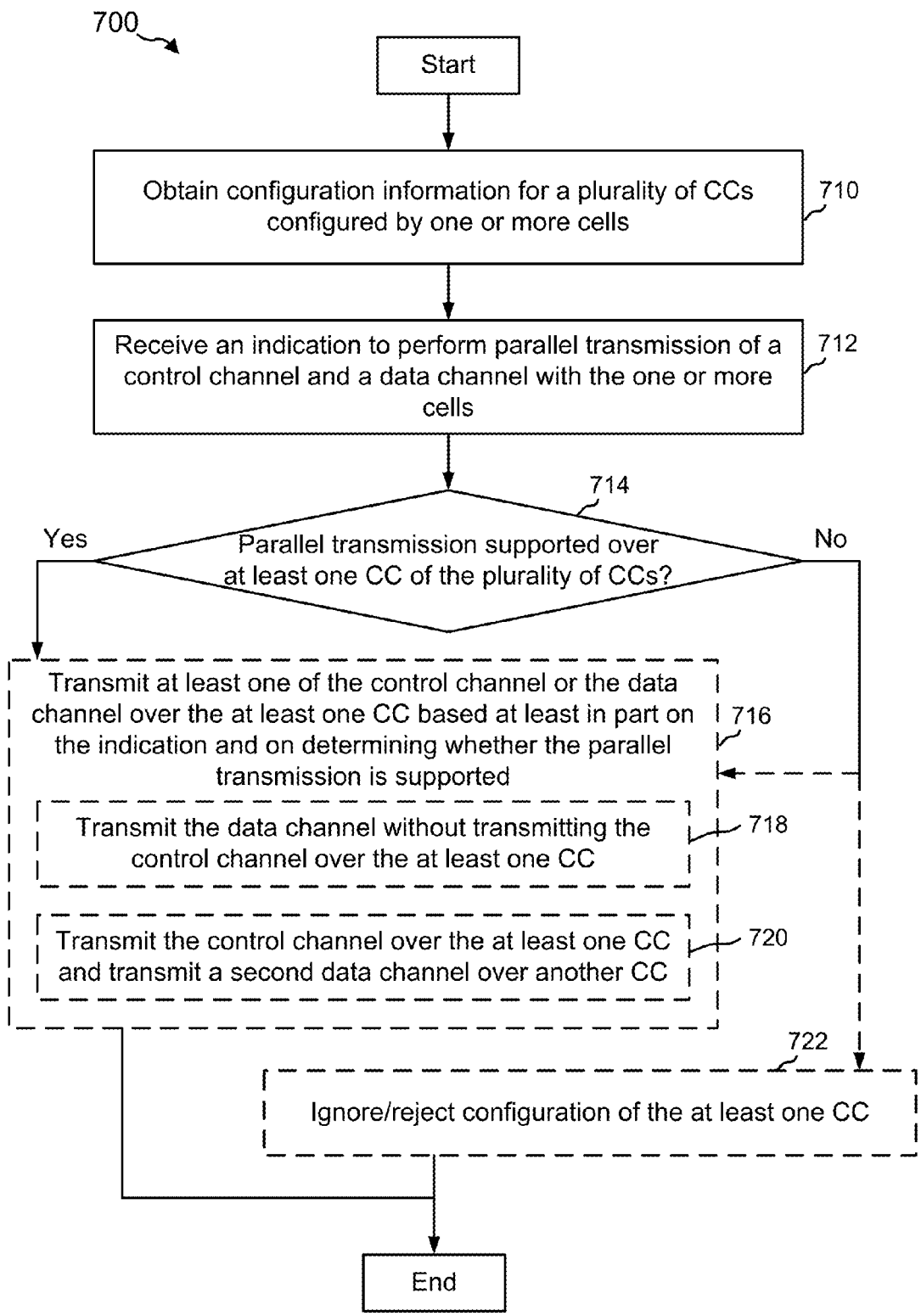
FIG. 7 is a flowchart illustrating a method for transmitting control and data channels, in accordance with various aspects of the present disclosure.

FIG. 6 is a block diagram 600 conceptually illustrating an example of a UE 615 and components configured in accordance with an aspect of the present disclosure. FIG. 7, which is described in conjunction with FIG. 6 herein, illustrates an example method 700 in accordance with aspects of the present disclosure. Although the operations described below in FIG. 7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 6, a base station/eNodeB 605-a (MeNodeB with a $PCell_{MCG}$), an optional base station/eNodeB 605-b (SeNodeB with a $PCell_{SCG}$), and the UE 615 of diagram 600 may be one of the base stations/eNodeBs (or APs) and UEs as described in various Figures. The MeNodeB 605-a, or a $PCell_{MCG}$ related thereto, and the UE 615 may communicate over a first communication link 625-a, which may include one or more carriers (e.g., a plurality of carriers configured in CA). The SeNodeB 605-b, or a $PCell_{SCG}$ related thereto, and the UE 615 may communicate over a second communication link 625-b. UE 615 may be configured to transmit a control channel and/or data channel over one or more carriers with the MeNodeB 605-a and/or SeNodeB 605-b.

In an aspect, MeNodeB 605-a and UE 615 (and/or SeNodeB 605-b and UE 615) may have established one or more downlink channels over communication link 625-a (and/or 625-b) for communicating downlink signals, which can be transmitted by MeNodeB 605-a (and/or SeNodeB 605-b) and received by UE 615 (e.g., via transceiver 606) for communicating control and/or data messages (e.g., in signaling) from the MeNodeB 605-a (and/or SeNodeB 605-b) to the UE 615 over configured communication resources. Moreover, for example, MeNodeB 605-a and UE 615 (and/or SeNodeB 605-b and UE 615) may have established one or more uplink channels over communication link 625-a (and/or 625-b) for communicating uplink signals, which can be transmitted by UE 615 (e.g., via transceiver 606) and received by MeNodeB 605-a (and/or SeNodeB 605-b) for communicating control and/or data messages (e.g., in signaling) from the UE 615 to the MeNodeB 605-a (and/or SeNodeB 605-b) over configured communication resources. In an example, communication link 625-a (and/or 625-b) may include multiple aggregated CCs.

In an aspect, UE 615 may include one or more processors 603 and/or a memory 609 that may be communicatively coupled, e.g., via one or more buses 607, and may operate in conjunction with or otherwise implement a communicating component 640 for transmitting a control channel and/or a data channel over a CC based at least in part on determining whether parallel transmissions are supported over the CC. For example, the various operations related to communicating component 640 may be implemented or otherwise executed by one or more processors 603 and, in an aspect, can be executed by a single processor, while in other aspects, different ones of the operations may be executed by a combination of two or more different processors. For example, in an aspect, the one or more processors 603 may include any one or any combination of a modem processor, or a baseband processor, or a digital signal processor, or an application specific integrated circuit (ASIC), or a transmit processor, receive processor, or a transceiver processor associated with transceiver 606. Further, for example, the memory 609 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 603. Moreover, memory 609 or computer-readable storage medium may be resident in the one or more processors 603, external to the one or more processors 603, distributed across multiple entities including the one or more processors 603, etc.

In particular, the one or more processors 603 and/or memory 609 may execute actions or operations defined by communicating component 640 or its subcomponents. For instance, the one or more processors 603 and/or memory 609 may execute actions or operations defined by a channel configuring component 650 for determining whether to configure a control and data channel for parallel transmissions over communications link(s) 625-a and/or 625-b. In an aspect, for example, channel configuring component 650 may include hardware (e.g., one or more processor modules of the one or more processors 603) and/or computer-readable code or instructions stored in memory 609 and executable by at least one of the one or more processors 603 to perform the specially configured channel configuring operations described herein.

It is to be appreciated that transceiver 606 may be configured to transmit and receive wireless signals through one or more antennas, an RF front end, one or more transmitters, and one or more receivers (not shown). In an aspect, transceiver 606 may be tuned to operate at one or more specified frequencies such that UE 615 and/or eNodeB 605-a (and/or 605-b) can communicate at a certain frequency. In an aspect, the one or more processors 603 may configure transceiver 606 to operate at a specified frequency and power level based on a configuration, a communication protocol, etc. to communicate uplink signals and/or downlink signals over related uplink or downlink communication channels.

In an aspect, transceiver 606 can operate in multiple bands (e.g., using a multiband-multimode modem, not shown) such to process digital data sent and received using transceiver 606. In an aspect, transceiver 606 can be multiband and be configured to support multiple frequency bands for a specific communications protocol. In an aspect, transceiver 606 can be configured to support multiple operating networks and communications protocols. Thus, for example, transceiver 606 may enable transmission and/or reception of signals based on a specified modem configuration.

FIG. 7 illustrates an example method 700 for transmitting (e.g., by a UE) a control channel and/or a data channel over at least one CC. Method 700 includes, at Block 710, obtaining configuration information for a plurality of CCs configured by one or more cells. Communicating component 640 (FIG. 6) can obtain configuration information for the plurality of CCs configured by one or more cells. For example, MeNodeB 605-a can provide one or more cells and can configure a plurality of CCs for communicating with UE 615 in CA over the one or more cells. In this example, one CC can be assigned as a PCC (or PCell) for the UE 615, over which the UE 615 can communicate control data related to the multiple CCs of a communication link 625-a to MeNodeB 605-a. In another example, in multiple connectivity, SeNodeB 605-*b* can provide one or more additional cells and can configure a plurality of CCs for communicating with the UE 615 in CA over the one or more additional cells. Similarly, in this example, one CC can be assigned as a PCC for the UE 615 over which the UE 615 can communicate control data related to the one or more additional CCs of a communication link 625-*b* to SeNodeB 605-*b*.

In a specific example, in LTE CA, MeNodeB 605-*a* can configure UE 615 with up to 5 CCs, including the PCC that can carry PUCCH. In dual connectivity, for example, MeNodeB 605-*a* and SeNodeB 605-*b* provide two groups of CCs that are connected under a non-ideal backhaul between MeNodeB 605-*a* and SeNodeB 605-*b*, where CCs in each group can be configured under CA (e.g., ideal backhaul connected). In dual connectivity, for example, each of the MeNodeB 605-*a* and SeNodeB 605-*b* can provide a PCC, which can be referred to as a PCell (e.g., $PCell_{MCG}$ and $PCell_{SCG}$, respectively for the MeNodeB 605-*a* and SeNodeB 605-*b*), such that uplink control information can be separately transmitted for each group over the corresponding PCell.

Method 700 further includes, at Block 712, receiving an indication to perform parallel transmission of a control channel and a data channel with the one or more cells. Channel configuring component 650 can receive the indication to perform parallel transmission of a control channel and a data channel with one or more cells. For example, channel configuring component 650 can receive the indication from a configuration stored by UE 615, a configuration received from one or more network entities (e.g., via MeNodeB 605-*a*), a configuration from MeNodeB 605-*a* or SeNodeB 605-*b*, and/or the like. Thus, for example, whether parallel transmission of the control and data channel is supported can be a UE capability. In a specific example, in LTE CA, the indication may relate to a simultaneousPUCCH-PUSCH-r10 configuration parameter configured at the UE 615, which can indicate whether the UE 615 baseband supports concurrent (e.g., simultaneous) transmission of PUCCH and PUSCH. In any case, where the indication is received, UE 615 can generally support parallel transmission of a control channel (e.g., PUCCH) and a data channel (e.g., PUSCH), but may be restricted from doing so over one carrier based on a configuration of the carrier, as described. In addition, in an example, channel configuring component 650 may communicate the configuration parameter to MeNodeB 605-*a* and/or SeNodeB 605-*b* to facilitate configuring CCs for UE 615, as described further herein (e.g. configuring CCs that can support parallel transmissions). In multiple connectivity in LTE, for example, parallel transmission between cell groups (e.g., MCG and SCG) is supported by the UE 615, which can be independent of the simultaneousPUCCH-PUSCH-r10 configuration parameter configured by UE 615.

In a specific example, in LTE, a UE supporting concurrent (e.g., simultaneous/parallel) transmission of PUCCH and PUSCH can transmit channel state information (CSI) over PUSCH while transmitting other control data over PUCCH where the transmissions can occur in parallel. For example, where there is no PUSCH transmission scheduled in a given subframe, communicating component 640 can transmit UCI over PUCCH. Where there is at least one PUSCH transmission scheduled in the subframe and the UCI includes only scheduling request (SR), only ACK/NACK, only SR and ACK/NACK, or only periodic CSI, communicating component 640 can transmit UCI over PUCCH. Where there is at least one PUSCH transmission scheduled in the subframe and the UCI includes periodic CSI and another UCI type (e.g., SR, ACK/NACK, or both), communicating component 640 can piggyback periodic CSI on one PUSCH CC and transmit the remaining UCI over PUCCH. It is to be appreciated that channel configuring component 650 can select the PUSCH CC for transmitting the periodic CSI based at least in part on determining that aperiodic CSI is also triggered to be transmitted on the PUSCH CC or otherwise determining a PUSCH CC having the lowest CC index. Where concurrent transmission of PUCCH and PUSCH is not supported in LTE, for example, communicating component 640 can transmit UCI over PUCCH where there is no PUSCH scheduled for transmission in the subframe, or can piggyback the UCI to PUSCH transmission where there is PUSCH scheduled for transmission in the subframe. In the latter case, it is to be appreciated that channel configuring component 650 can select the PUSCH CC based on similar criteria as described for concurrent transmission of PUCCH and PUSCH.

Method 700 also includes, at Block 714, determining whether parallel transmission is supported over at least one CC of the plurality of CCs. Channel configuring component 650 can determine whether parallel transmission (e.g., of the control channel and the data channel) is supported over at least one CC of the plurality of CCs. For example, one or more CCs configured by the MeNodeB 605-*a* and/or SeNodeB 605-*b* may not support parallel transmission of channels over the CC, and thus UE 615 may not be able to transmit the control channel and data channel in parallel over the CC. In one example, channel configuring component 650 may determine whether the parallel transmission is supported based on one or more parameters configured in the UE 615 or received by a network entity, etc. that correspond to the one or more CCs. In addition, channel configuring component 650 may determine whether parallel transmissions are supported for a PCC in this regard. For instance, in a specific example, the one or more parameters may include a non-ContiguousUL-RA-WithinCC-Info-r10 parameter in LTE, which can be specified for each CC and can indicate whether the UE 615 supports non-contiguous uplink resource allocations for a given CC. A true value (e.g., 1) for this parameter may indicate that the UE 615 supports non-contiguous resource allocations over the CC, and can thus support parallel transmission of PUCCH and PUSCH over the CC, and a false value (e.g., 0) for this parameter may indicate that the UE 615 does not support non-contiguous resource allocations over the CC, and cannot support parallel transmission of PUCCH and PUSCH over the CC (e.g., regardless of the simultaneousPUCCH-PUSCH-r10 parameter value). In any case, where the at least one CC is a PCC configured by the MeNodeB 605-*a* or SeNodeB 605-*b*, UE 615 may determine whether to transmit the control channel and/or the data channel over the PCC in a given period of time (e.g., subframe) based on whether parallel transmission of the control channel and data channel is supported over the CC.

In either case where parallel transmission is or is not supported over at least one CC at Block 714, method 700 may optionally include, at Block 716, transmitting at least one of the control channel or the data channel over the at least one CC based at least in part on the indication and on determining whether the parallel transmission is supported. Communicating component 640 can transmit at least one of the control channel or the data channel over the at least one CC based at least in part on the indication and on determining whether parallel transmission is supported. For example, in LTE, though the UE 615 may indicate support of parallel PUCCH and PUSCH transmission (e.g., via simultaneous- PUCCH-PUSCH-r10), the UE 615 may not be able to perform parallel PUCCH and PUSCH on a same carrier of different bands, as described (e.g., based on a nonContiguousUL-RA-WithinCC-Info-r10 value for the CC). Thus, in one example, where channel configuring component 650 determines that parallel transmission is not supported over the CC and the CC is configured as the PCC with MeNodeB 605-*a* or SeNodeB 605-*b*, channel configuring component 650 can disable parallel transmission of the control channel and data channel for the UE 615, and communicating component 640 can transmit either the control channel or the data channel on the CC and/or on all CCs of a communication link 625-*a* and/or 625-*b* in a given period of time (e.g., a subframe). For example, communicating component 640 may transmit the control channel or data channel over the CCs as described above (e.g., transmit the control channel when the data channel is not available, transmit the data channel when available but not the control channel, piggyback control data on the data channel when the data channel is available, etc.). In an example, communicating component 640 may transmit the other one of the control channel or the data channel on another CC configured with the MeNodeB 605-*a* and/or SeNodeB 605-*b* (e.g., but may not transmit the control channel and data channel in parallel over the multiple CCs since the functionality is disabled).

In another example, where channel configuring component 650 determines that parallel transmission is not supported over the CC and the CC is configured as the PCC with MeNodeB 605-*a* or SeNodeB 605-*b*, channel configuring component 650 can generally configure channels to support parallel transmission of the control channel and data channel over other CCs, but may configure channels for transmission over the PCC to include one of the control channel or the data channel. Thus, in an example, transmitting at least one of the control channel or the data channel over the at least one CC may optionally include, at Block 718, transmitting the data channel without transmitting the control channel over the at least one CC. For example, if a data channel (e.g., PUSCH) is scheduled for transmission in a subframe over the CC that does not support parallel transmissions, channel configuring component 650 can configure the data channel for transmission over the CC, and communicating component 640 can transmit the data channel without transmitting the control channel, as described above. This can occur over the PCC in CA, a PCC in a MCG in multiple connectivity, a PCC in a SCG in multiple connectivity, etc., where channel configuring component 650 determines that the PCC does not support parallel transmissions. In this example, communicating component 640 may transmit at least a portion of control data (e.g., UCI) over the data channel as described (e.g., by piggybacking the control data with an aperiodic CSI or otherwise in a data channel having a lowest CC index). The control data may relate to the PCC and/or related CCs (e.g., SCCs in a same cell group in multiple connectivity). Where the data channel is not scheduled for transmission, however, communicating component 640 can transmit the control channel over the PCC including the control data.

In another example, transmitting at least one of the control channel or the data channel over the at least one CC may optionally include, at Block 720, transmitting the control channel over the at least one CC and transmitting a second data channel over another CC. Channel configuring component 650 can configure the control channel for transmission over the at least one CC and the second data channel for transmission over another CC, and communicating component 640 may transmit the control channel over the at least one CC (e.g., the PCC) and may transmit a second data channel (e.g., including data that may have been scheduled over the data channel of the PCC) over another CC configured with the MeNodeB 605-*a* or SeNodeB 605-*b*, which may or may not occur in parallel. For example, channel configuring component 650 can configure the second data channel for transmission over a SCC (e.g., of the same or different cell group in multiple connectivity), over a PCC of another cell group, etc.

In another example, if MeNodeB 605-*a* and/or SeNodeB 605-*b* are aware of CC restrictions of the UE 615 (e.g., where the MeNodeB 605-*a* and/or SeNodeB 605-*b* configure the CCs and related parameters), MeNodeB 605-*a* and/or SeNodeB 605-*b* can avoid configuring a CC that does not support parallel channel transmissions as a PCC for UE 615, as described herein. In this regard, parallel control channel and data channel transmissions can be supported over another CC (if other CCs support parallel channel transmissions) configured as the PCC. In this example, an eNodeB may configure CCs that do not support parallel channel transmissions as SCCs, since SCCs are typically configured for data channel communications, and related control information is carried on the PCC.

In another example, where parallel transmission is not supported over at least one CC at Block 714, method 700 may optionally include, at Block 722, ignoring/rejecting a configuration of the at least one CC. For example, channel configuring component 650 may determine the CC is misconfigured by the MeNodeB 605-*a* or SeNodeB 605-*b* where the at least one CC does not support parallel channel transmissions but is configured as the PCC. In this example, channel configuring component 650 may ignore or reject the CC configuration. For example, channel configuring component 650, in this regard, may request network access or use a previous CC configuration, reject the CC configuration by indicating to the MeNodeB 605-*a* or SeNodeB 605-*b* that the CC configuration is not valid (as parallel control and data channel transmissions cannot be fully supported), declare radio link failure, and/or the like.

Figure 8:
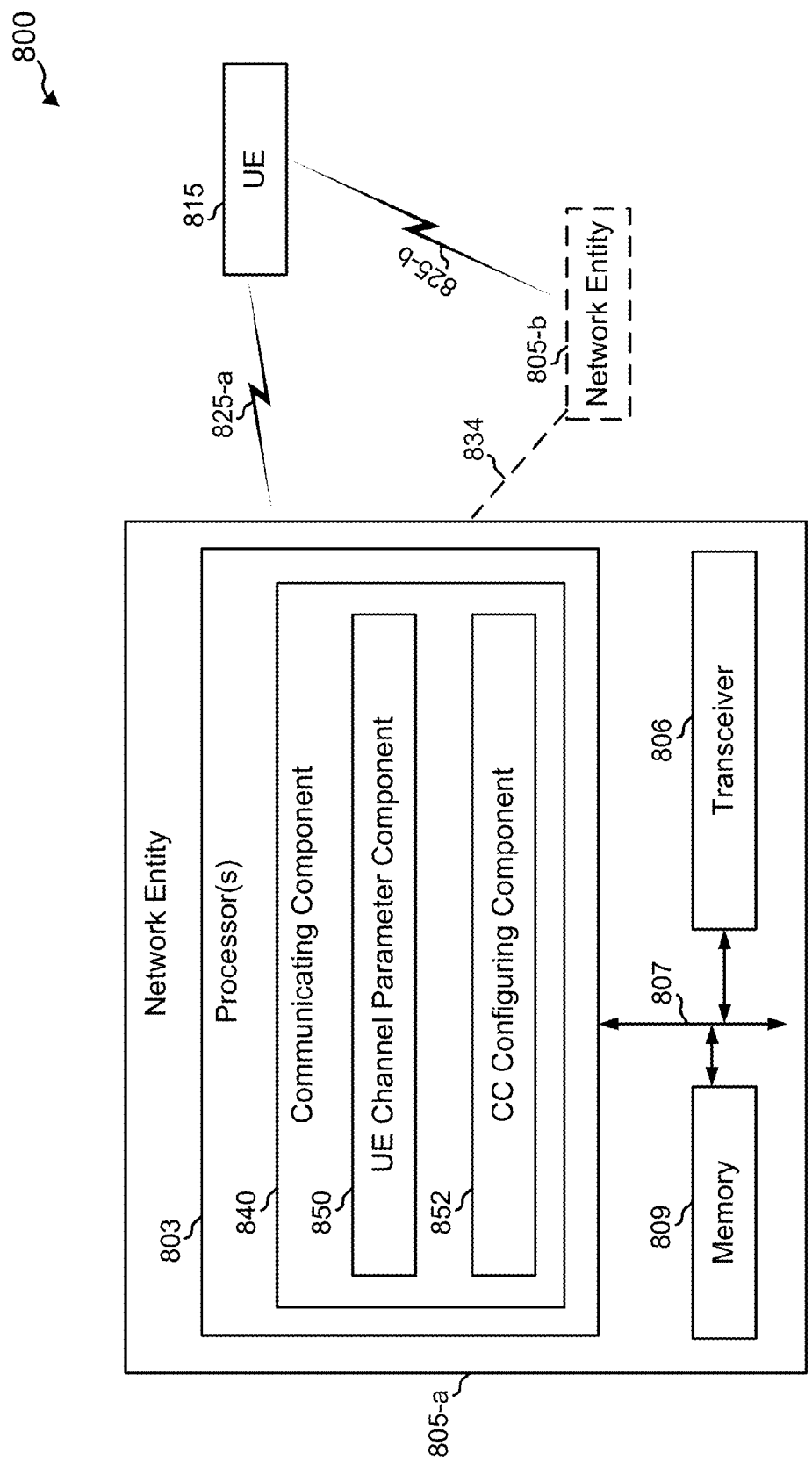
FIG. 8 is a block diagram conceptually illustrating an example of a network entity configured to provide a component carrier configuration for one or more UEs in accordance with various aspects of the present disclosure.
Figure 9:
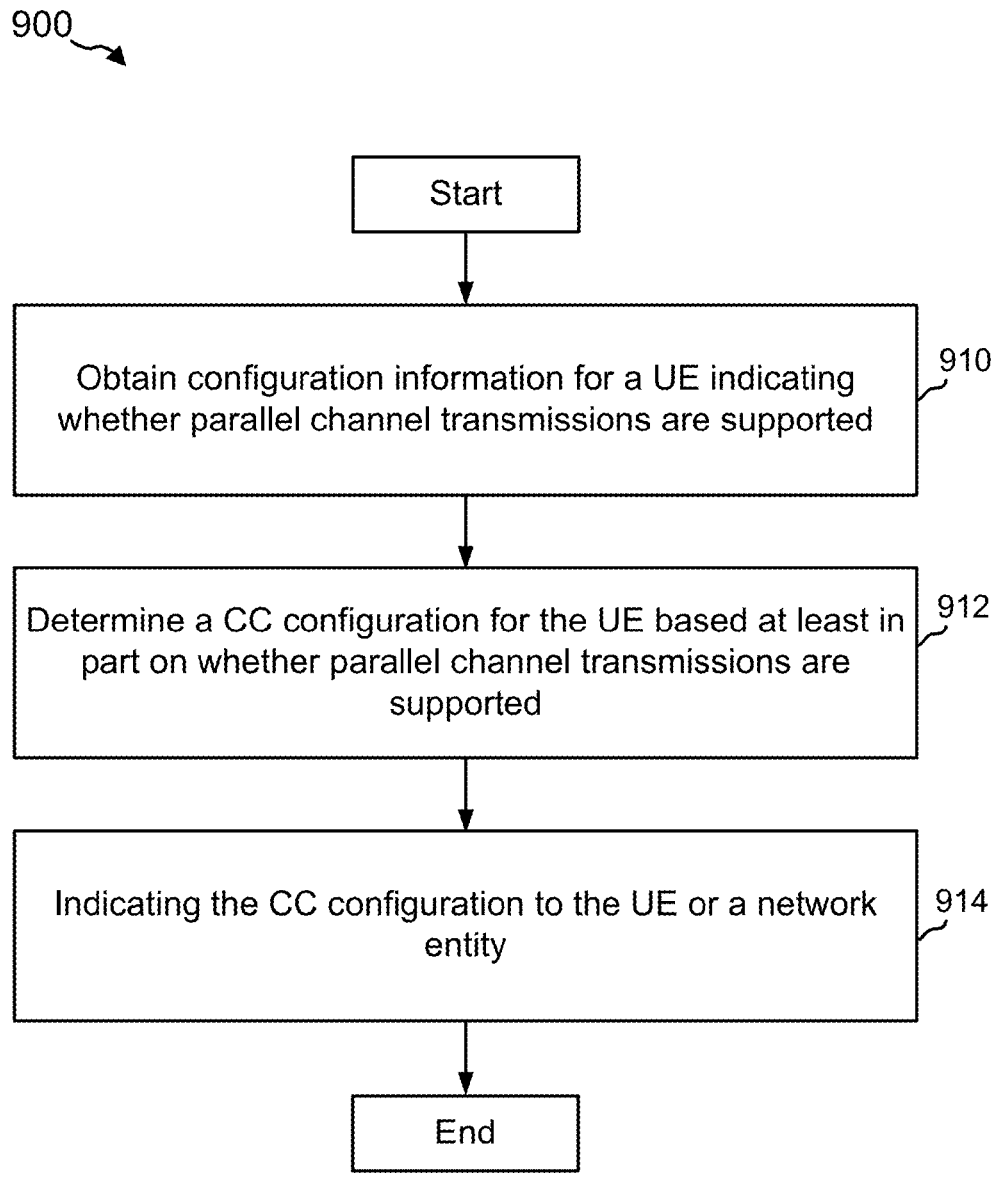
FIG. 9 is a flowchart illustrating a method for configuring component carriers, in accordance with various aspects of the present disclosure.

FIG. 8 is a block diagram 800 conceptually illustrating an example of a network entity 805-*a* and components configured in accordance with an aspect of the present disclosure. FIG. 9, which is described in conjunction with FIG. 8 herein, illustrates an example method 900 in accordance with aspects of the present disclosure. Although the operations described below in FIG. 9 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Referring to FIG. 8, diagram 800 includes a network entity 805-*a* and optional network entity 805-*b*, which can include one or more previously described base stations/eNodeBs (e.g., MeNodeB 605-*a* with a PCell$_{MCG}$, SeNodeB with a PCell$_{SCG}$, related cells, etc.), or other network entities, along with a UE 815, which can include one or more previously described UEs (e.g., UE 615). The network entity 805-*a* and the UE 815 may communicate over first communication link 825-*a*, and the network entity 805-*b* (where present) and UE 815 may communicate over second communication link 825-b. UE 815 may be configured to prioritize communications with network entity 805-a and/or 805-b, as described herein.

In an aspect, network entity 805-a and UE 615 may have established one or more downlink channels over communication link 825-a for communicating downlink signals, which can be transmitted by network entity 805-a (e.g. via transceiver 806) and received by UE 815 for communicating control and/or data messages (e.g., in signaling) from the network entity 805-a to the UE 815 over configured communication resources. Moreover, for example, network entity 805-a and UE 815 may have established one or more uplink channels over communication link 825-a for communicating uplink signals, which can be transmitted by UE 815 and received by network entity 805-a (e.g., via transceiver 806) for communicating control and/or data messages (e.g., in signaling) from the UE 815 to the network entity 805-a over configured communication resources. In an example, communication link 625-a may include multiple aggregated CCs. In addition, network entity 805-b and UE 815 may have similarly established uplink and/or downlink channels over communication link 825-b.

In an aspect, network entity 805-a may include one or more processors 803 and/or a memory 809 that may be communicatively coupled, e.g., via one or more buses 807, and may operate in conjunction with or otherwise implement a communicating component 840 for generating a CC configuration for one or more UEs 815. For example, the various operations related to communicating component 840 may be implemented or otherwise executed by one or more processors 803 and, in an aspect, can be executed by a single processor, while in other aspects, different ones of the operations may be executed by a combination of two or more different processors. For example, in an aspect, the one or more processors 803 may include any one or any combination of a modem processor, or a baseband processor, or a digital signal processor, or an application specific integrated circuit (ASIC), or a transmit processor, receive processor, or a transceiver processor associated with transceiver 806. Further, for example, the memory 809 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 803. Moreover, memory 809 or computer-readable storage medium may be resident in the one or more processors 803, external to the one or more processors 803, distributed across multiple entities including the one or more processors 803, etc.

In particular, the one or more processors 803 and/or memory 809 may execute actions or operations defined by communicating component 840 or its subcomponents. For instance, the one or more processors 803 and/or memory 809 may execute actions or operations defined by a UE channel parameter component 850 for obtaining one or more parameters related to whether the UE 815 supports parallel channel transmissions on a baseband and/or for a given CC. In an aspect, for example, UE channel parameter component 850 may include hardware (e.g., one or more processor modules of the one or more processors 803) and/or computer-readable code or instructions stored in memory 809 and executable by at least one of the one or more processors 803 to perform the specially configured parameter obtaining operations described herein. In addition, for instance, the one or more processors 803 and/or memory 809 may execute actions or operations defined by a CC configuring component 852 for generating and indicating a configuration for one or more CCs to the UE 815 and/or another network entity 805-b. In an aspect, for example, CC configuring component 852 may include hardware (e.g., one or more processor modules of the one or more processors 803) and/or computer-readable code or instructions stored in memory 809 and executable by at least one of the one or more processors 803 to perform the specially configured CC configuring operations described herein.

It is to be appreciated that transceiver 806 may be configured to transmit and receive wireless signals through one or more antennas, an RF front end, one or more transmitters, and one or more receivers (not shown). In an aspect, transceiver 806 may be tuned to operate at one or more specified frequencies such that UE 815 and/or network entity 805-a can communicate at a certain frequency. In an aspect, the one or more processors 803 may configure transceiver 806 to operate at a specified frequency and power level based on a configuration, a communication protocol, etc. to communicate uplink signals and/or downlink signals over related uplink or downlink communication channels.

In an aspect, transceiver 806 can operate in multiple bands (e.g., using a multiband-multimode modem, not shown) such to process digital data sent and received using transceiver 806. In an aspect, transceiver 806 can be multiband and be configured to support multiple frequency bands for a specific communications protocol. In an aspect, transceiver 806 can be configured to support multiple operating networks and communications protocols. Thus, for example, transceiver 806 may enable transmission and/or reception of signals based on a specified modem configuration.

In addition, network entity 805-a may be coupled with network entity 805-b over backhaul link 834. Transceiver 806 can also be operable for communicating with network entity 805-b over a wired or wireless backhaul. It is to be appreciated that network entity 805-b may include similar components as network entity 805-a, which may be omitted from FIG. 8 for ease of explanation.

FIG. 9 illustrates an example method 900 for configuring (e.g., by an eNodeB) CCs for a UE. Method 900 includes, at Block 910, obtaining configuration information for a UE indicating whether parallel channel transmissions are supported. UE channel parameter component 850 (FIG. 8) can obtain the configuration information for the UE indicating whether parallel channel transmissions are supported. For example, UE channel parameter component 850 can obtain the configuration information from the UE 815 (e.g., as part of network provisioning), from configuration information for the UE 815 stored at the network entity 805-a or other network component, and/or the like. As described, the configuration information may indicate whether the UE supports parallel channel transmissions for a control channel and a data channel at a baseband, whether the UE supports parallel channel transmissions on a given CC, etc. In a specific example, the configuration information may relate to one or more of a simultaneousPUCCH-PUSCH-r10 or nonContiguousUL-RA-WithinCC-Info-r10 parameter indicated by/for the UE 815 in LTE.

Method 900 further includes, at Block 912, determining a CC configuration for the UE based at least in part on whether parallel channel transmissions are supported. CC configuring component 852 can determine the CC configuration for the UE based at least in part on whether parallel channel transmissions are supported. For example, CC configuring component 852 can select one or more CCs for the UE 815 based at least in part on whether parallel channel transmissions are supported by the UE 815 on a baseband and/or for a given CC. For example, where the configuration information obtained by UE channel parameter component 850 indicates that the UE 815 supports parallel data channel and control channel transmissions on a baseband, CC configuring component 852 can determine a CC over which the UE 815 supports parallel channel transmissions for assigning as a PCC for UE 815 in CA or multiple connectivity. Similarly, in this regard, CC configuring component 852 can avoid assigning CCs over which the UE 815 does not support parallel channel transmissions as the PCC for UE 815 in CA or multiple connectivity. In this regard, as described, the UE 815 can avoid the situation where it is configured to support parallel control and data channel transmissions on the baseband but is unable to transmit channels in parallel over the PCC. In a specific example, in LTE, where UE channel parameter component 850 determines that a simultaneous-PUCCH-PUSCH-r10 parameter for UE 815 is set to true, CC configuring component 852 can configure a CC as a PCC for UE 815 based at least in part on determining that the nonContiguousUL-RA-WithinCC-Info-r10 for the CC at the UE 815 is also set to true. Similarly, CC configuring component 852 can avoid configuring a CC as a PCC for UE 815 where the nonContiguousUL-RA-WithinCC-Info-r10 for the CC at the UE 815 is also set to false.

Method 900 further includes, at Block 914, indicating the CC configuration to the UE or a network entity. Communicating component 840 can indicate the CC configuration to the UE 815 or network entity 805-*b*. Thus, in an example, the UE 815 can communicate with the network entity 805-*a* over the configured CCs. Moreover, in an example, in multiple connectivity, CC configuring component 852 can determine a CC configuration for UE 815 that includes assigning a CC from another network entity, and thus communicating component 840 indicates the CC configuration to network entity 805-*b* over backhaul link 834 as well. This can facilitate communications between the UE 815 and network entity 805-*b* as well, where communicating component 840 and/or network entity 805-*b* may notify UE 815 of the additional CC configuration with network entity 805-*b*.

Figure 10:
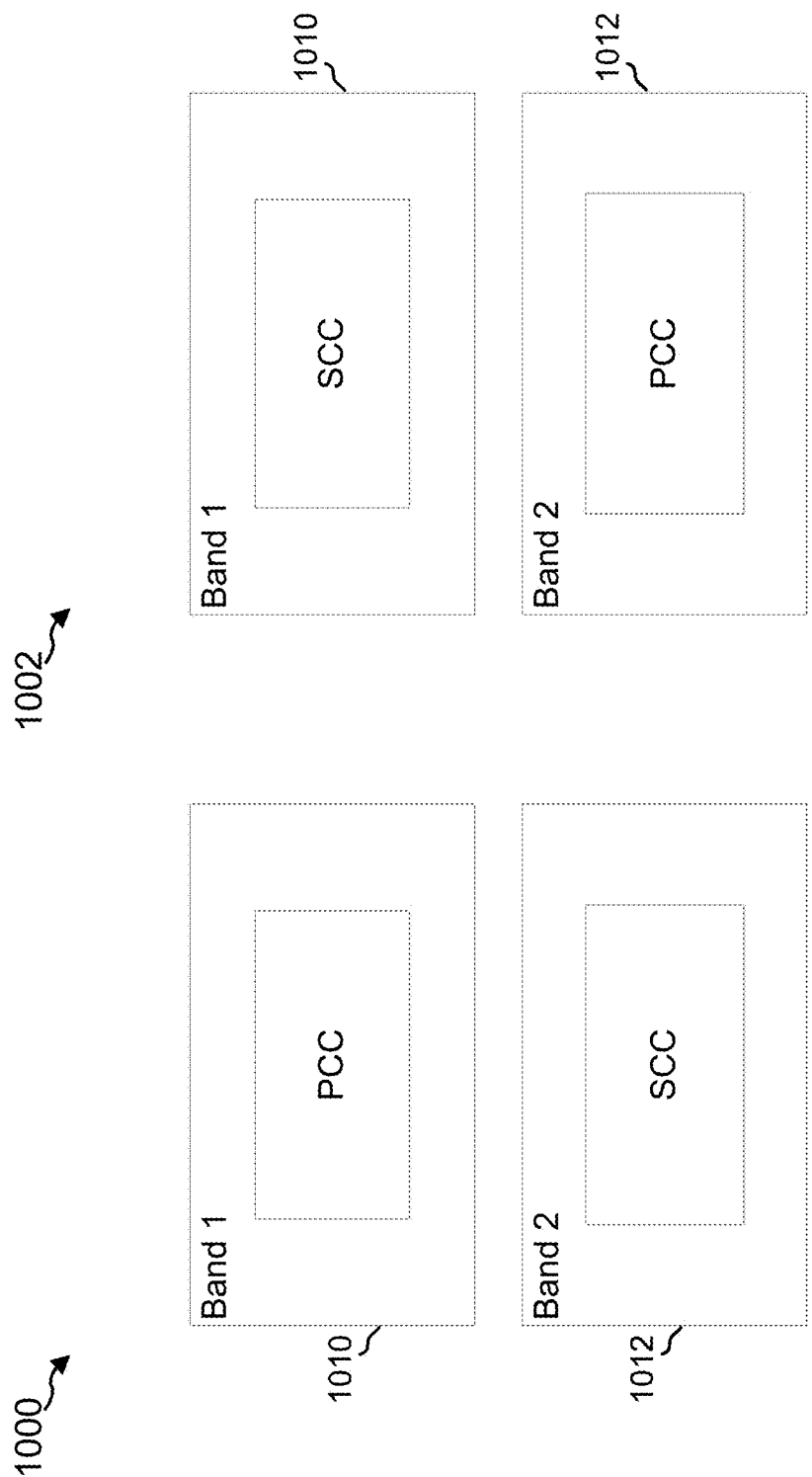
FIG. 10 illustrates example component carrier configurations in accordance with aspects described herein.

FIG. 10 illustrates example CC configurations 1000 and 1002 over two frequency bands. In this example, a UE (e.g., UE 615 or 815) may support parallel control channel and data channel transmissions, but may not support parallel transmissions over band 1 1010 (where band 1 corresponds to a first CC), and may support parallel transmissions over band 2 1012 (where band 2 corresponds to a second CC). Thus, where band 1 1010 is assigned as a PCC for uplink and downlink communications (also referred to as a PCell) and band 2 1012 as an SCC for uplink and downlink communications (also referred to as an SCell), as in configuration 1000, the UE cannot configure parallel control and data channel transmissions on the PCC. In this regard, as described, the UE can disable (e.g., via a channel configuring component 650) parallel control and data channel transmissions altogether or continue to support parallel transmissions using multiple carriers. In either case, in LTE for example, PUCCH or PUSCH can be supported over the PCC (band 1 1010), and if PUSCH is supported, control data can be transmitted over PUSCH as well in an example. In another example, the UE may consider the band configuration 1000 as a misconfiguration, as described previously, based on band 1 1010 configured as PCC though parallel channel transmissions are not supported over band 1 1010, and may ignore/reject the CC configuration 1000.

In configuration 1002, where band 1 1010 is configured as SCC and band 2 1012 is configured as PCC, the UE can support parallel control and data channel transmissions. In this example, because the UE supports parallel channel transmissions over band 2 1012, configuring band 2 1012 as the PCC allows for the parallel channel transmissions. Band 1 1010 can be configured as the SCC, which does not need to support parallel channel transmissions as the SCell typically carries data channels and no control channels. As described, in one example, the eNodeB can accordingly configure band 1 1010 as SCC and band 2 1012 as PCC based on determining the ability of the UE to support parallel channel transmissions over band 2 1012 and/or based on determining the inability of the UE to support parallel channel transmissions over band 1 1000.

Figure 11:
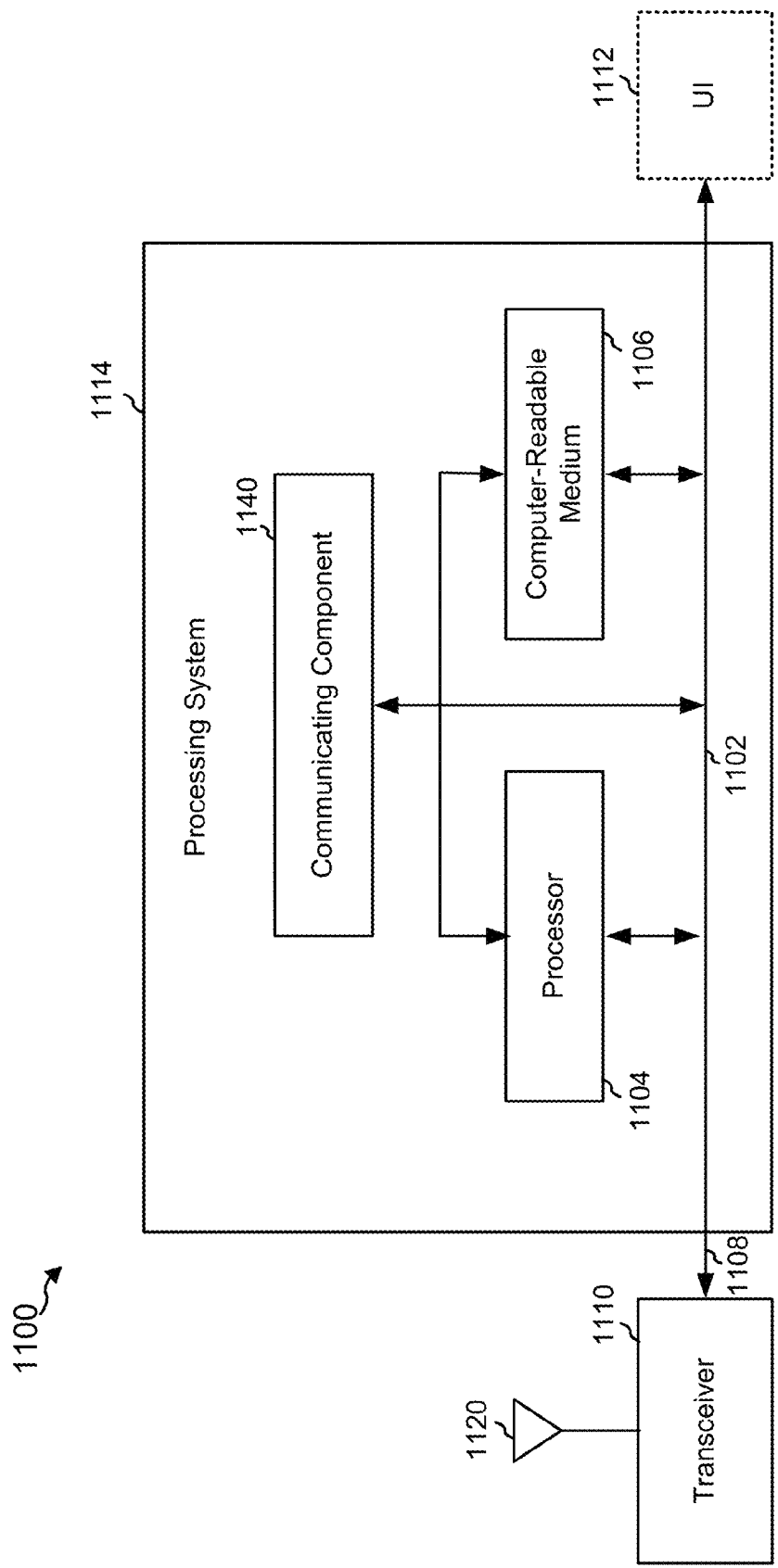
FIG. 11 is a block diagram conceptually illustrating an example hardware implementation for an apparatus employing a processing system configured in accordance with various aspects of the present disclosure.

FIG. 11 is a block diagram conceptually illustrating an example hardware implementation for an apparatus 1100 employing a processing system 1114 configured in accordance with an aspect of the present disclosure. The processing system 1114 includes a communicating component 1140. In one example, the apparatus 1100 may be the same or similar, or may be included with one of the UEs described in various Figures. In such example, the communicating component 1140 may correspond to, for example, the communicating component 640 of UE 615, communicating component 840 of network entity 805-*a*, etc. In this example, the processing system 1114, which may correspond to or include processor(s) 603, 803 in FIGS. 6 and 8, may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (e.g., central processing units (CPUs), microcontrollers, application specific integrated circuits (ASICs), field programmable gate arrays (FPGAs)) represented generally by the processor 1104, and computer-readable media, represented generally by the computer-readable medium 1106. In an example, the computer-readable medium 1106 may correspond to or may include memory 609, 809 in FIGS. 6 and 8. The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110, which is connected to one or more antennas 1120 for receiving or transmitting signals. In an example, the transceiver 1110 may correspond to or may include transceivers 606, 806 in FIGS. 6 and 8. The transceiver 1110 and the one or more antennas 1120 provide a mechanism for communicating with various other apparatus over a transmission medium (e.g., over-the-air). Depending upon the nature of the apparatus, a user interface (UI) 1112 (e.g., keypad, display, speaker, microphone, joystick) may also be provided.

The processor 1104 is responsible for managing the bus 1102 and general processing, including the execution of software stored on the computer-readable medium 1106. The software, when executed by the processor 1104, causes the processing system 1114 to perform the various functions described herein for any particular apparatus. The computer-readable medium 1106 may also be used for storing data that is manipulated by the processor 1104 when executing software. The communicating component 1140 as described above may be implemented in whole or in part by processor 1104, or by computer-readable medium 1106, or by any combination of processor 1104 and computer-readable medium 1106.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but it is to be accorded the widest scope consistent with the principles and novel features disclosed herein.

What is claimed is:

1. A method for communicating over a plurality of component carriers in a wireless network, comprising:
    obtaining, by a user equipment (UE), configuration information for the plurality of component carriers configured by one or more cells;
    receiving, by the UE, an indication to perform parallel transmission of a control channel and a data channel with the one or more cells;
    determining, by the UE and based on receiving the indication, that the parallel transmission is not supported over at least one component carrier of the plurality of component carriers, wherein the at least one component carrier corresponds to a primary cell of the one or more cells; and
    transmitting, by the UE, one of the control channel or the data channel over the at least one component carrier based at least in part on the indication to perform the parallel transmission and based at least in part on determining that the parallel transmission is not supported over the at least one component carrier.

2. The method of claim 1, wherein transmitting one of the control channel or the data channel comprises transmitting the data channel based on determining that the parallel transmission is not supported over the at least one component carrier, and further comprising transmitting control data over the data channel.

3. The method of claim 1, further comprising:
    determining that the data channel is not scheduled to be transmitted over the at least one component carrier; and
    identifying a second data channel over a second component carrier from the plurality of component carriers, wherein transmitting comprises transmitting the control channel over the at least one component carrier, and further comprising transmitting the second data channel over the second component carrier.

4. The method of claim 3, further comprising transmitting at least a portion of control data using the second data channel over the second component carrier.

5. The method of claim 1, wherein the configuration information relates to configuring the plurality of component carriers over a first cell group and a second cell group in dual connectivity, and wherein the at least one component carrier is configured as a primary component carrier for one of the first cell group or the second cell group.

6. The method of claim 1, wherein the configuration information relates to configuring the plurality of component carriers with a first cell in carrier aggregation, and wherein the at least one component carrier is configured as a primary component carrier.

7. The method of claim 1, wherein the configuration information relates to configuring the plurality of component carriers over a first cell group and a second cell group in carrier aggregation, and wherein the at least one component carrier is configured as a primary component carrier for one of the first cell group or the second cell group.

8. The method of claim 1, wherein determining that the parallel transmission is not supported over the at least one component carrier comprises determining whether non-contiguous resource allocations are supported over the at least one component carrier.

9. The method of claim 1, further comprising indicating, to at least one cell of the one or more cells, that the parallel transmission of the control channel and the data channel is supported by the UE over multiple component carriers.

10. The method of claim 9, wherein receiving the indication to perform the parallel transmission of the control channel and the data channel is based at least in part on indicating, to the at least one cell, that the parallel transmission of the control channel and the data channel is supported by the UE over multiple component carriers.

11. A user equipment for communicating over a plurality of component carriers in a wireless network, comprising:
a transceiver;
at least one processor communicatively coupled with the transceiver, via a bus, for communicating signals in the wireless network; and
a memory communicatively coupled with the at least one processor and/or the transceiver via the bus;
wherein the at least one processor and the memory are operable to:
obtain configuration information for the plurality of component carriers configured by one or more cells;
receive an indication to perform parallel transmission of a control channel and a data channel with the one or more cells;
determine, based on receiving the indication, that the parallel transmission is not supported over at least one component carrier of the plurality of component carriers, wherein the at least one component carrier corresponds to a primary cell of the one or more cells; and
transmit one of the control channel or the data channel over the at least one component carrier based at least in part on the indication to perform the parallel transmission and based at least in part on determining that the parallel transmission is not supported over the at least one component carrier.

12. The user equipment of claim 11, wherein the at least one processor and the memory are operable to transmit the data channel based on determining that the parallel transmission is not supported over the at least one component carrier, and wherein the at least one processor and the memory are further operable to transmit control data over the data channel.

13. The user equipment of claim 11, wherein the at least one processor and the memory are further operable to:
determine that the data channel is not scheduled to be transmitted over the at least one component carrier; and
identify a second data channel over a second component carrier from the plurality of component carriers,
wherein the at least one processor and the memory are operable to transmit the control channel over the at least one component carrier, and further operable to transmit the second data channel over the second component carrier.

14. The user equipment of claim 13, wherein the at least one processor and the memory are further operable to transmit at least a portion of control data using the second data channel over the second component carrier.

15. The user equipment of claim 11, wherein the configuration information relates to configuring the plurality of component carriers over a first cell group and a second cell group in dual connectivity, and wherein the at least one component carrier is configured as a primary component carrier for one of the first cell group or the second cell group.

16. The user equipment of claim 11, wherein the configuration information relates to configuring the plurality of component carriers with a first cell in carrier aggregation, and wherein the at least one component carrier is configured as a primary component carrier.

17. The user equipment of claim 11, wherein the configuration information relates to configuring the plurality of component carriers over a first cell group and a second cell group in carrier aggregation, and wherein the at least one component carrier is configured as a primary component carrier for one of the first cell group or the second cell group.

18. The user equipment of claim 11, wherein the at least one processor and the memory are operable to determine that the parallel transmission is not supported over the at least one component carrier at least in part by determining whether non-contiguous resource allocations are supported over the at least one component carrier.

19. A user equipment for communicating over a plurality of component carriers in a wireless network, comprising:
means for obtaining configuration information for the plurality of component carriers configured by one or more cells;
means for receiving an indication to perform parallel transmission of a control channel and a data channel with the one or more cells;
means for determining, based on receiving the indication, that the parallel transmission is not supported over at least one component carrier of the plurality of component carriers, wherein the at least one component carrier corresponds to a primary cell of the one or more cells; and
means for transmitting one of the control channel or the data channel over the at least one component carrier based at least in part on the indication to perform the parallel transmission and based at least in part on determining that the parallel transmission is not supported over the at least one component carrier.

20. The user equipment of claim 19, wherein the means for transmitting transmits the data channel based on determining that the parallel transmission is not supported over the at least one component carrier, and further comprising means for transmitting control data over the data channel.

21. The user equipment of claim 19, further comprising:
means for determining that the data channel is not scheduled to be transmitted over the at least one component carrier; and
means for identifying a second data channel over a second component carrier from the plurality of component carriers,
wherein the means for transmitting transmits the control channel over the at least one component carrier, and transmits the second data channel over the second component carrier.

22. The user equipment of claim 19, wherein the configuration information relates to configuring the plurality of component carriers over a first cell group and a second cell group in dual connectivity, and wherein the at least one component carrier is configured as a primary component carrier for one of the first cell group or the second cell group.

23. The user equipment of claim 19, wherein the configuration information relates to configuring the plurality of component carriers with a first cell in carrier aggregation, and wherein the at least one component carrier is configured as a primary component carrier.

24. The user equipment of claim 19, wherein the configuration information relates to configuring the plurality of component carriers over a first cell group and a second cell group in carrier aggregation, and wherein the at least one component carrier is configured as a primary component carrier for one of the first cell group or the second cell group.

25. The user equipment of claim 19, wherein the means for determining determines that the parallel transmission is not supported over the at least one component carrier at least in part by determining whether non-contiguous resource allocations are supported over the at least one component carrier.

26. A non-transitory computer-readable storage medium comprising computer-executable code for communicating over a plurality of component carriers in a wireless network, the code comprising:
code for obtaining, by a user equipment (UE), configuration information for the plurality of component carriers configured by one or more cells;
code for receiving, by the UE, an indication to perform parallel transmission of a control channel and a data channel with the one or more cells;
code for determining, by the UE and based on receiving the indication, that the parallel transmission is not supported over at least one component carrier of the plurality of component carriers, wherein the at least one component carrier corresponds to a primary cell of the one or more cells; and
code for transmitting, by the UE, one of the control channel or the data channel over the at least one component carrier based at least in part on the indication to perform the parallel transmission and based at least in part on determining that the parallel transmission is not supported over the at least one component carrier.

27. The non-transitory computer-readable storage medium of claim 26, wherein the code for transmitting transmits the data channel based on determining that the parallel transmission is not supported over the at least one component carrier, and further comprising code for transmitting control data over the data channel.

28. The non-transitory computer-readable storage medium of claim 26, wherein the code further comprises:
code for determining that the data channel is not scheduled to be transmitted over the at least one component carrier; and
code for identifying a second data channel over a second component carrier from the plurality of component carriers,
wherein the code for transmitting transmits the control channel over the at least one component carrier, and transmits the second data channel over the second component carrier.

29. The non-transitory computer-readable storage medium of claim 26, wherein the configuration information relates to configuring the plurality of component carriers over a first cell group and a second cell group in dual connectivity, and wherein the at least one component carrier is configured as a primary component carrier for one of the first cell group or the second cell group.

30. The non-transitory computer-readable storage medium of claim 26, wherein the configuration information relates to configuring the plurality of component carriers with a first cell in carrier aggregation, and wherein the at least one component carrier is configured as a primary component carrier.

* * * * *